(12) United States Patent
Matsusaka

(10) Patent No.: US 7,265,912 B2
(45) Date of Patent: Sep. 4, 2007

(54) VARIABLE POWER OPTICAL SYSTEM, IMAGING APPARATUS, AND DIGITAL APPARATUS

(75) Inventor: Keiji Matsusaka, Osaka (JP)

(73) Assignee: Konica Minolta Opto, Inc., Hachioji-Shi (JP)

(*) Notice: Subject to any disclaimer, the term of this patent is extended or adjusted under 35 U.S.C. 154(b) by 0 days.

(21) Appl. No.: 11/105,844

(22) Filed: Apr. 14, 2005

(65) Prior Publication Data
US 2005/0231818 A1    Oct. 20, 2005

(30) Foreign Application Priority Data
Apr. 20, 2004  (JP) .............................. 2004-123997

(51) Int. Cl.
*G02B 15/14*    (2006.01)
(52) U.S. Cl. ...................................... 359/691; 359/689
(58) Field of Classification Search ................ 359/691, 359/689
See application file for complete search history.

(56) References Cited

U.S. PATENT DOCUMENTS 5,009,491 A   4/1991  Hata ......................... 350/427
6,349,002 B1  2/2002  Shibayama et al. ......... 359/689
6,417,973 B2* 7/2002  Mihara et al. .............. 359/684

FOREIGN PATENT DOCUMENTS

JP        7-306362 A     11/1995

OTHER PUBLICATIONS

US 6,301,062, 10/2001, Ohmori et al. (withdrawn)*

* cited by examiner

*Primary Examiner*—Ricky Mack
*Assistant Examiner*—William Choi
(74) *Attorney, Agent, or Firm*—Sidley Austin LLP

(57) ABSTRACT

A small high-definition variable power optical system having a variable power ratio of about two to three times; an imaging apparatus including the variable power optical system; and digital equipment mounted with the imaging apparatus are provided. The variable power optical system, consisting of a plurality of lens groups, for performing variable power by changing the distance between each lens groups in an optical axis direction is configured by two or more lens groups, each having negative or positive optical power, arranged in such order from the object side. The first lens group is a cemented lens configured by at least one negative lens and at least one positive lens arranged in order from the object side. At least one aspherical surface is arranged to each of the first lens group and the second lens group. A third lens group having a positive optical power is arranged on the image plane side of the second lens group.

15 Claims, 17 Drawing Sheets

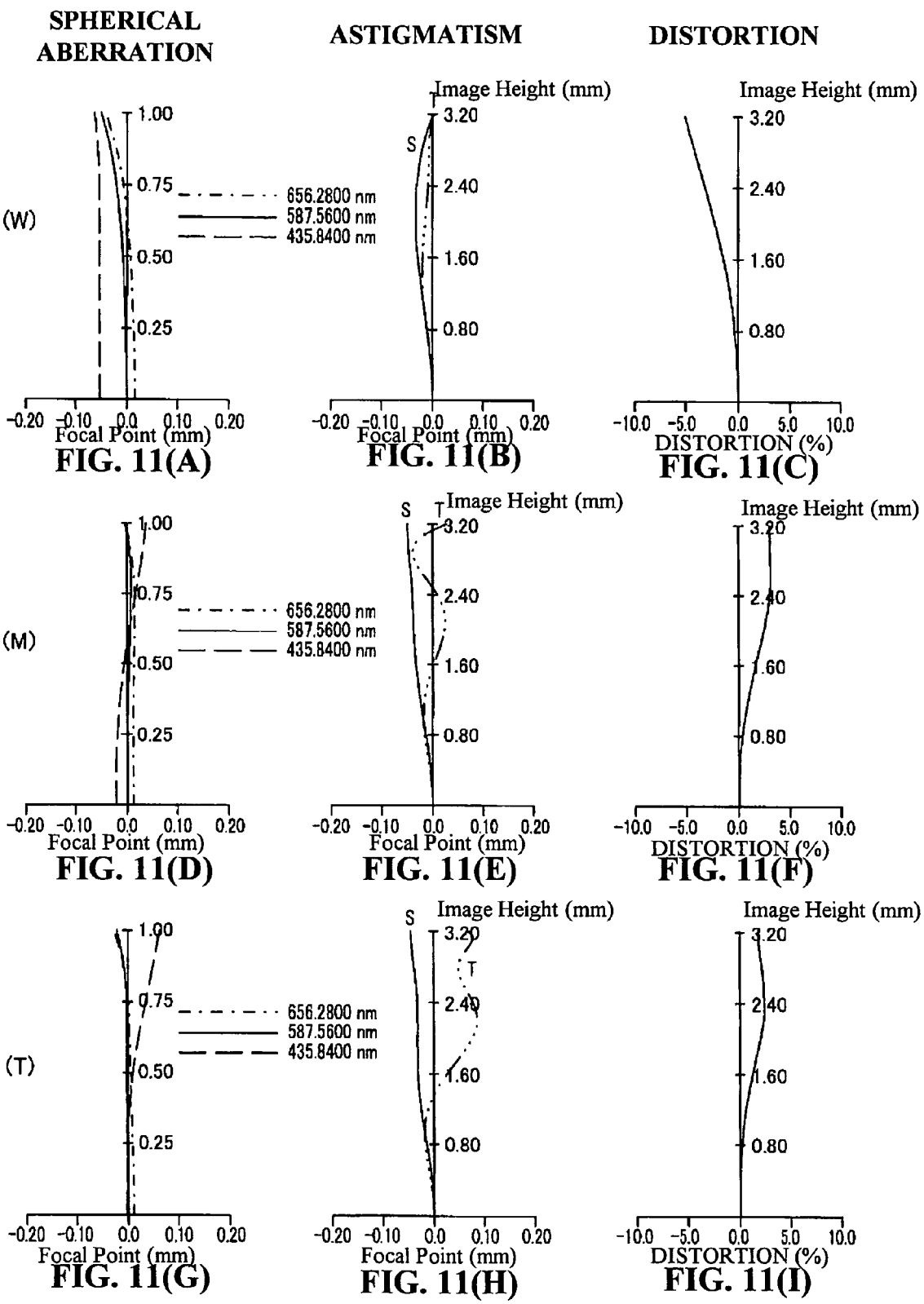

| SPHERICAL ABERRATION | ASTIGMATISM | DISTORTION |
|---|---|---|
| 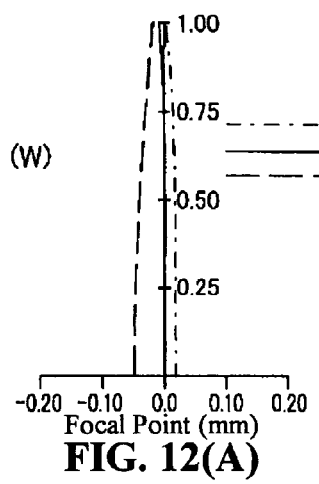 FIG. 12(A) | 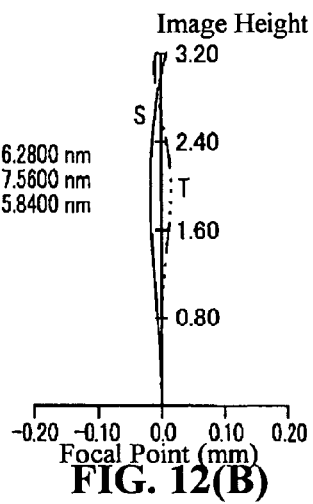 FIG. 12(B) | 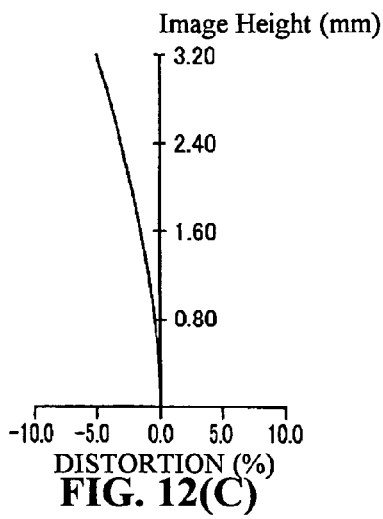 FIG. 12(C) |
| 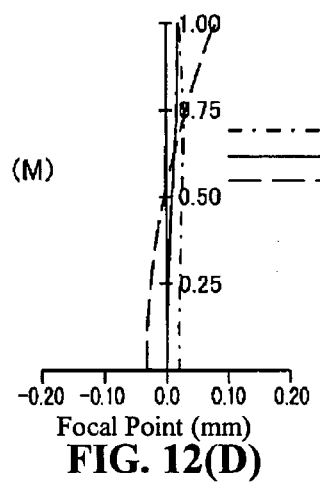 FIG. 12(D) | 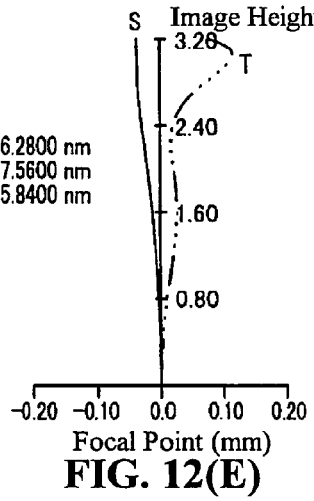 FIG. 12(E) | 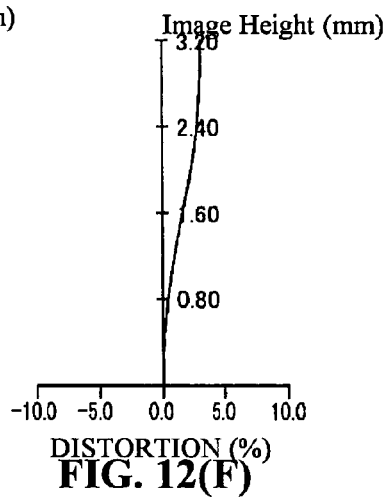 FIG. 12(F) |
| 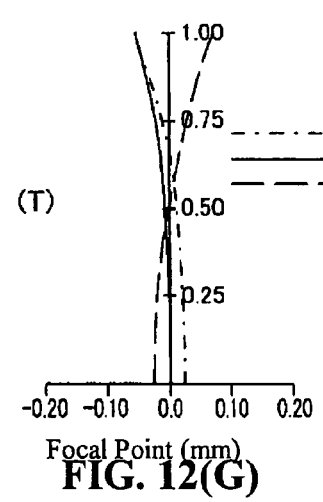 FIG. 12(G) | 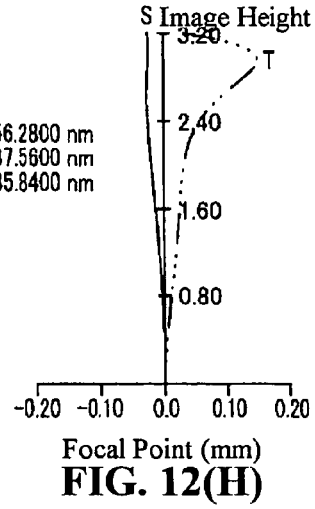 FIG. 12(H) | 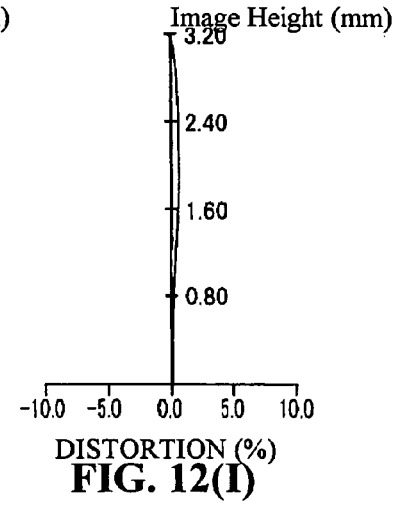 FIG. 12(I) |

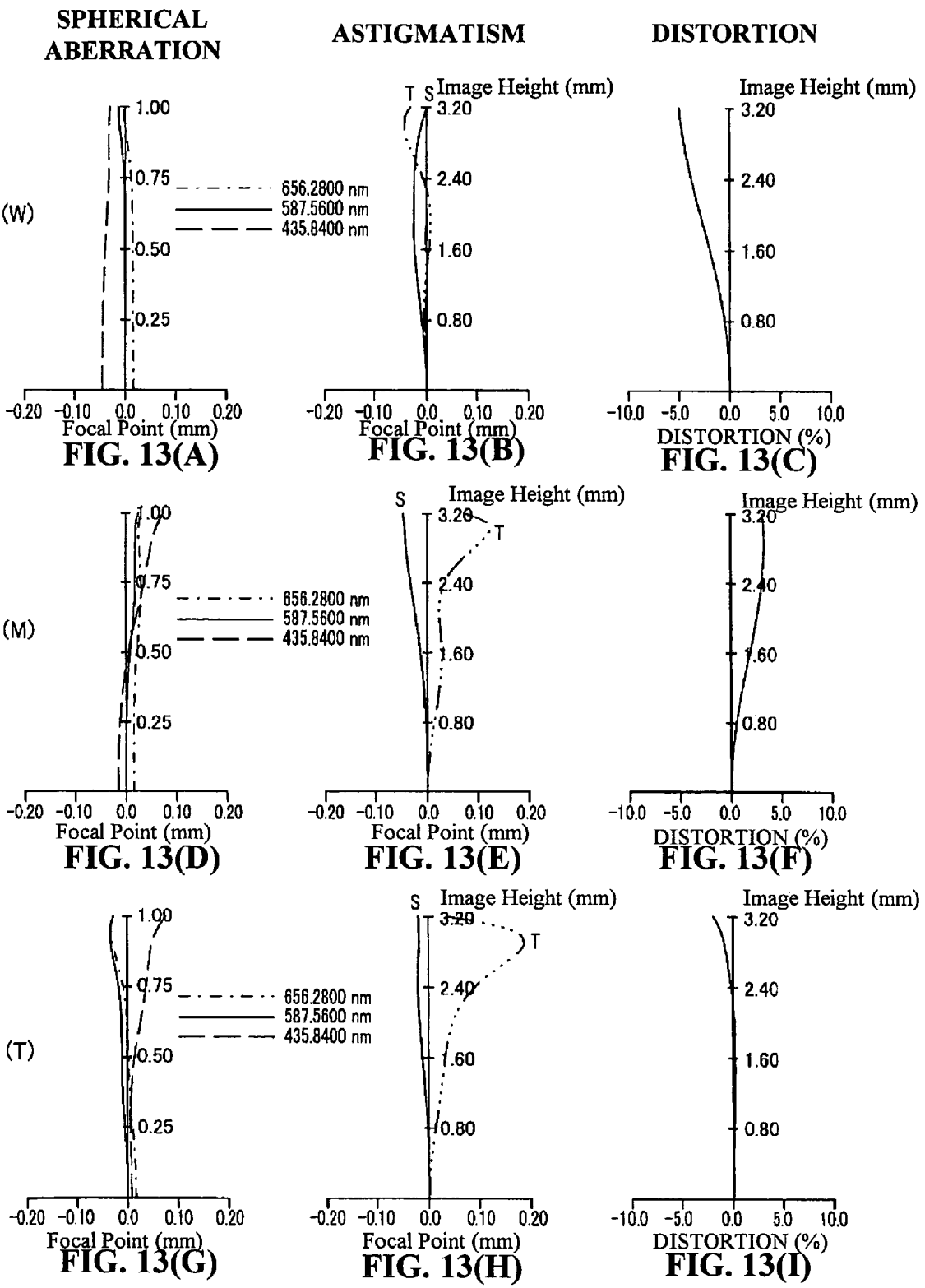

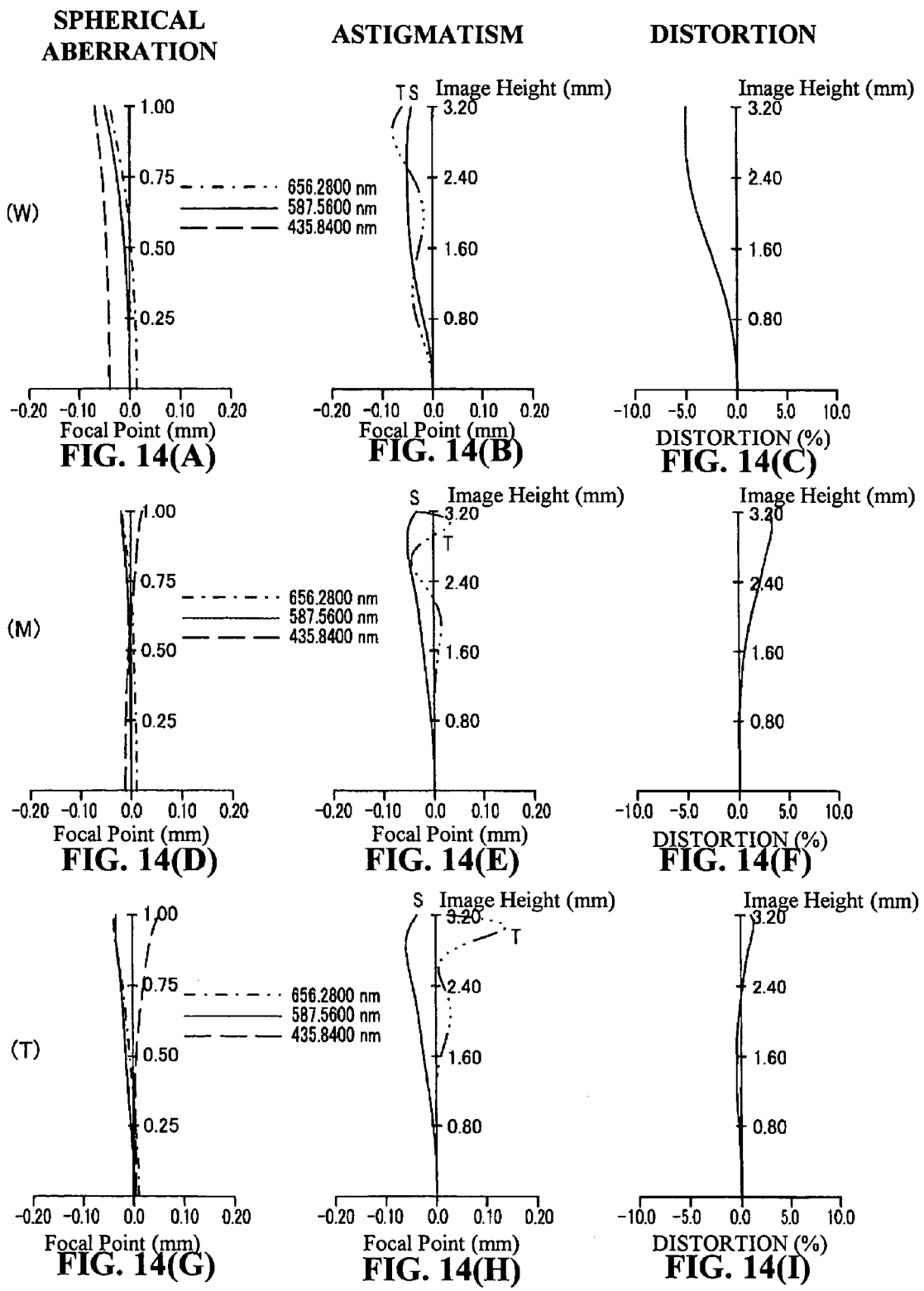

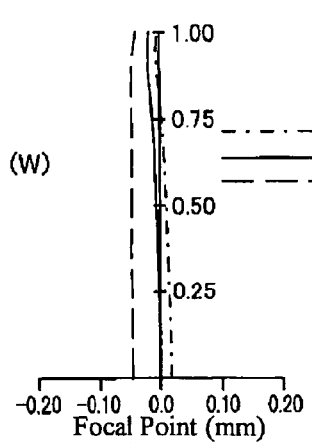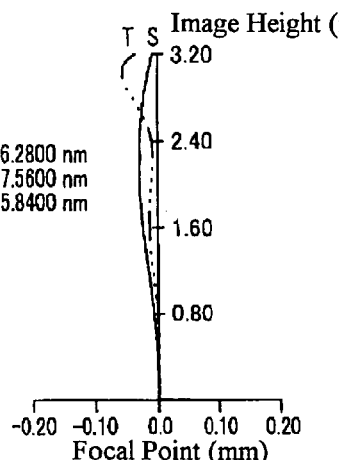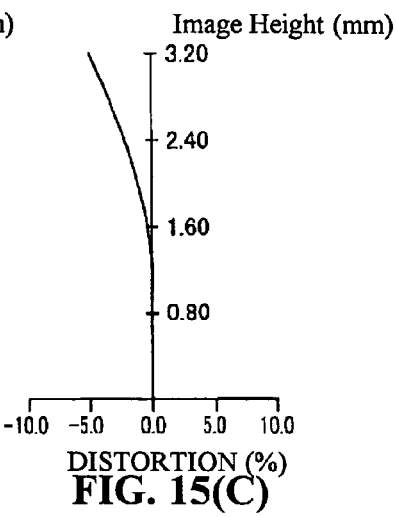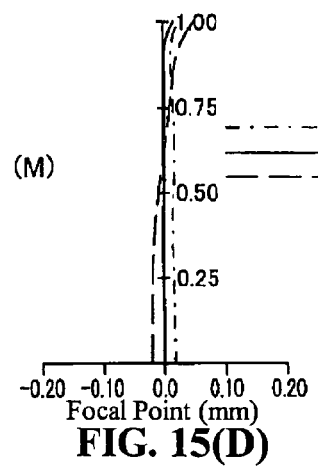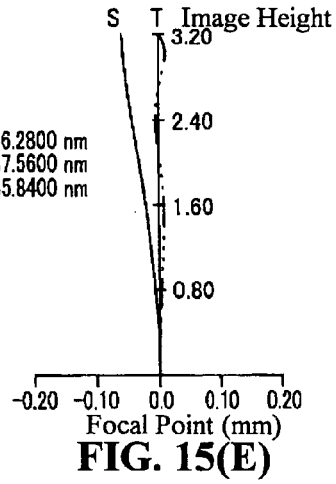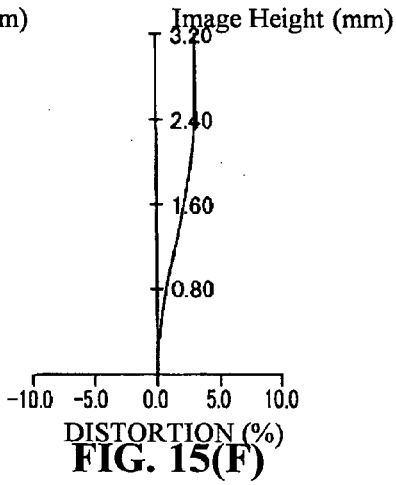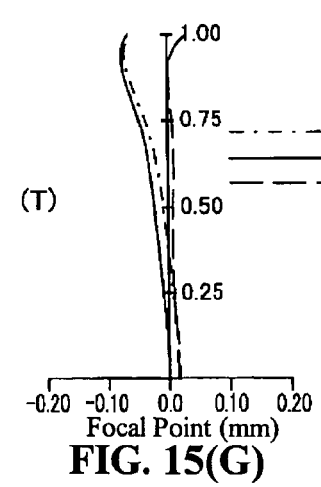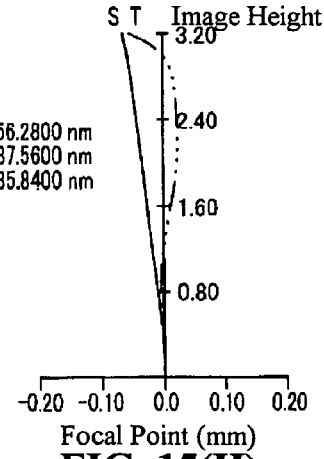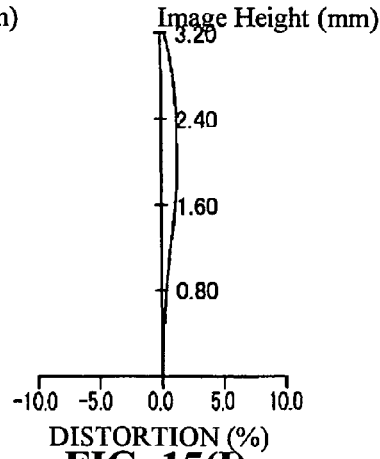

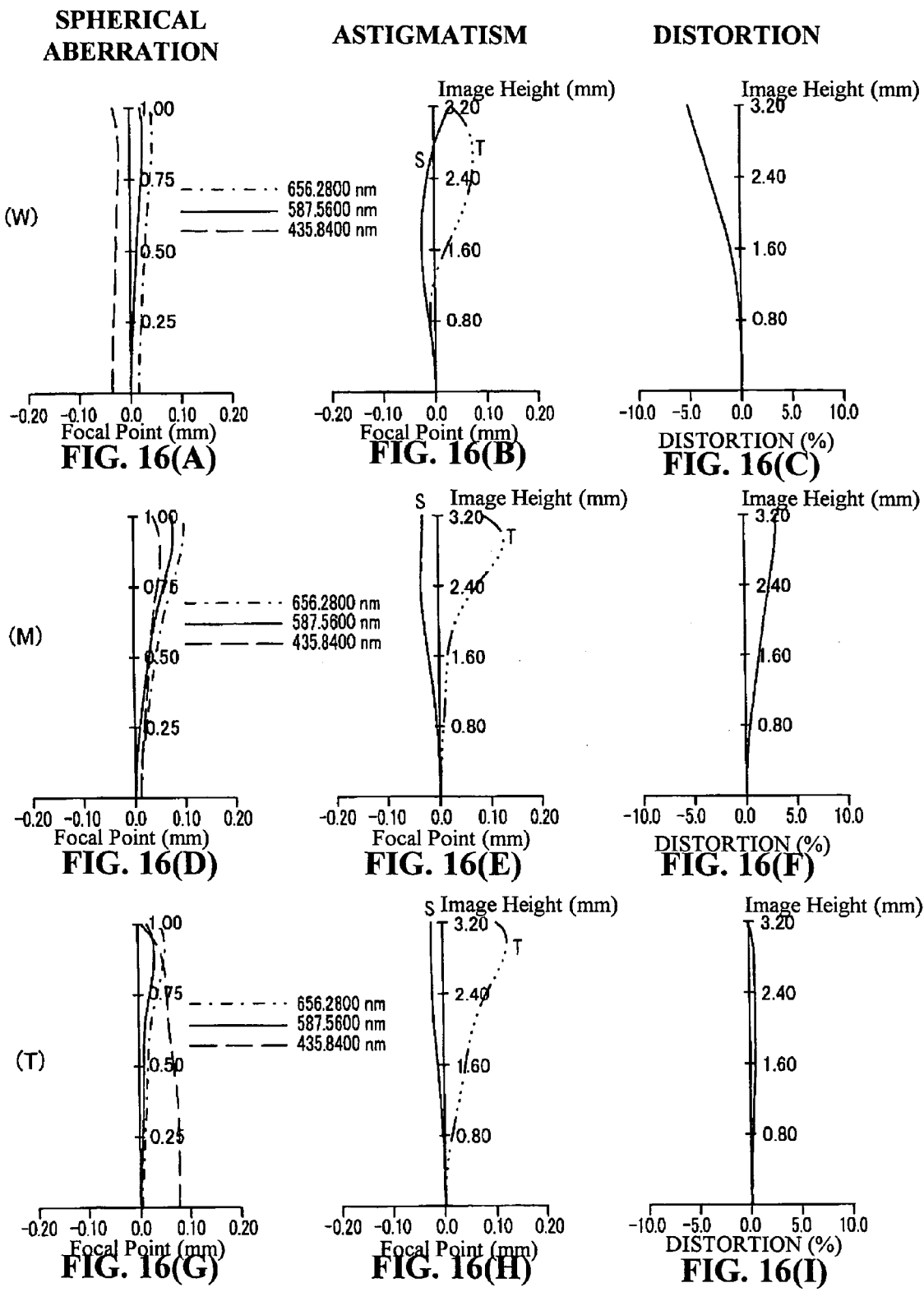

VARIABLE POWER OPTICAL SYSTEM, IMAGING APPARATUS, AND DIGITAL APPARATUS

The present application claims priority to Japanese Patent Application No. 2004-123997 filed Apr. 20, 2004, the entire content of which is hereby incorporated by reference.

BACKGROUND OF THE INVENTION

1. Field of the Invention

The present invention relates to a variable power optical system, consisting of a plurality of lens groups, for carrying out variable power by changing the distance between each lens group in the optical axis direction, an imaging apparatus including the variable power optical system, and a digital equipment mounted with the imaging apparatus.

2. Description of the Related Art

Recently, portable telephones and personal digital assistants (PDA) are being used widespread, and the specification of having a compact digital still camera unit or a digital video camera unit built into such equipment is becoming common. In such equipment, the imaging apparatus including a small imaging element having a low pixel number compared to a digital still camera and the like, and a single focal point optical system consisting of about one to three plastic lenses, which are independent products, is commonly being used due to strict restrictions on size and cost.

However, as the magnification of the single focal point optical system is about the same as visual observation, the object that can be photographed is limited to that near the photographer. In the present days where higher pixel and higher performance of the imaging element are rapidly advancing, a compact variable power optical system that is mountable to a portable telephone and the like, that handles high-pixel imaging element and that photographs even subjects distant from the photographer is becoming necessary.

For the variable power optical system of a compact configuration, a variable power optical system of three components of negative, positive, positive components consisting of a first lens group having a negative optical power, a second lens group having a positive optical power and a third lens group having a positive optical power, arranged in this order from the object side, is proposed in for example, U.S. Pat. No. 5,009,491 and U.S. Pat. No. 6,349,002. Further, in Japanese Patent Application Laid-Open No. 7-306362, a variable power optical system configured by five components including four components of negative, positive, positive, negative components in the order from the first lens group closest to the object is proposed in an aim to achieve a higher definition optical system. In these three prior arts, the first lens group is configured by a cemented lens, and thus the assembly adjustment is easy. Further, in Japanese Patent Application Laid-Open No. 7-306362, a configuration for shortening the entire optical length by appropriately setting the optical power of each lens group or displacement condition and the like of each lens group involved in variable power is disclosed.

However, the variable power optical system according to U.S. Pat. No. 5,009,491 has a great number of lenses of eight or nine lenses, and the entire optical length is also long. In the variable power optical system according to U.S. Pat. No. 6,349,002, the second lens group has large displacement amount, and as a result, the entire optical length becomes long, so that this optical system is not suitable for further compactness. The F-number of the wide-angle end is about 3.5 to 4 and is dark. The variable optical system of Japanese Patent Application Laid-Open No. 7-306362 has the first lens group configured with only the cemented lens and made into a simple configuration, but the total number of lenses is 10 or is a great number and thus the cost is high. Further, as a great number or five lens groups move when performing variable power, the device configuration including the driving device becomes complicated and as a result, the unit size becomes large.

Therefore, in the conventional variable power optical system, the number of lens increases and the entire optical length becomes long when having high-pixel imaging element. Thus, the conventional configuration is difficult to be made more compact.

As the error sensitivity within the lens group that carries out variable power becomes high when achieving compactness, the adjustment task between lenses is necessary. Consequently, in the conventional variable power optical system, simultaneous achievement of high-pixel imaging element, lower cost, and further a compact size that can be accommodated in the portable telephone or a personal digital assistant is not possible.

SUMMARY OF THE INVENTION

The present invention mainly aims to provide a variable power optical system in which error sensitivity of the lens group is low and adjustment between lenses is easy.

The present invention also aims to provide a compact and inexpensive variable power optical system that responds to high pixel imaging element.

In one aspect of the present invention, in order to achieve the above aims and other aims, the variable power optical system that performs variable power by changing the distance between each lens group in an optical axis direction includes from an object side, a first lens group including a cemented lens, configured by less than or equal to three lenses, including at least one aspherical surface and having a negative optical power as a whole; and a second lens group including at least one aspherical surface and having a positive optical power as a whole, wherein the distance between the first lens group and the second lens group is narrowed when performing variable power from wide-angle end to telephoto end.

According to such configuration, the first lens group positioned closest to the object side is a so-called negative lead having a negative optical power. Thus, rays entering at a large angle from the object side are among the first to be mitigated by the negative optical power of the first lens group. In the configuration of the negative lead, increase in error sensitivity is suppressed even if the size is made small. Generally, when the first lens group is configured by one negative lens, the optical power of the first lens group cannot be made strong to suppress generation of astigmatism and chromatic aberration of magnification at the first lens group. As a result, the front cell diameter of the first lens group increases. When configured by a plurality of lenses, decentration error sensitivity in the first lens group increases when made compact in the optical axis direction, thus requiring adjustment between lenses in the first lens group.

In a configuration in which the first lens group includes the cemented lens, increase in front cell diameter is prevented, and at the same time, error sensitivity caused by decentration is reduced. Further, in a configuration in which the optical power of the lens group includes negative and positive optical power in the order from the object side, the first lens group is mainly related to off-axis aberration and the second lens group is mainly related to axial aberration.

Various aberrations are each corrected by applying aspherical surface in the first lens group and the second lens group. Reduction of error sensitivity and correction of off-axis aberration are both achieved by combining the cemented lens and the aspherical lens.

The first lens group is arranged closest to the object side, and thus generally has a large lens diameter compared to other lens groups. Increasing the number of lenses having a large diameter causes increase in load imposed on a lens driving device and thus is not preferable. Lighter lens group and satisfactory aberration correction are both achieved by configuring the lens group with less than or equal to three lenses.

The invention itself, together with further objects and attendant advantages, will best be understood by reference to the following detailed description taken in conjunction with the accompanying drawings.

BRIEF DESCRIPTION OF THE DRAWINGS

FIGS. 11(a) to 11(i) are aberration diagrams showing spherical aberration, astigmatism and distortion aberration of Embodiment 1;

FIGS. 12(a) to 11(i) are aberration diagrams showing spherical aberration, astigmatism and distortion aberration of Embodiment 2;

FIGS. 13(a) to 13(i) are aberration diagrams showing spherical aberration, astigmatism and distortion aberration of Embodiment 3;

FIGS. 14(a) to 14(i) are aberration diagrams showing spherical aberration, astigmatism and distortion aberration of Embodiment 4;

FIGS. 15(a) to 15(i) are aberration diagrams showing spherical aberration, astigmatism and distortion aberration of Embodiment 5;

FIGS. 16(a) to 16(i) are aberration diagrams showing spherical aberration, astigmatism and distortion aberration of Embodiment 6.

In the following description, like parts are designated by like reference numbers throughout the several drawings.

DETAILED DESCRIPTION OF THE PREFERRED EMBODIMENTS

FIG. 10 is a configuration view of an outer appearance of a portable telephone equipped with camera showing one embodiment of a digital equipment according to the present invention. In the present invention, the digital equipment may be, besides the portable telephone mentioned above, a digital still camera, a digital video camera, a personal digital assistant (PDA), a personal computer, a mobile computer or peripheral devices thereof. The digital still camera and the digital video camera are imaging apparatuses that optically retrieve the picture of the subject and then convert the picture to an electric signal using a semiconductor element, and further store the same into a flash memory and the like as digital data. The present invention also relates to portable telephones, personal digital assistants, personal computers, mobile computers and peripheral devices thereof with a specification of including a compact imaging apparatus for optically retrieving the still image or moving image of the subject.

Figures 10A, 10B:
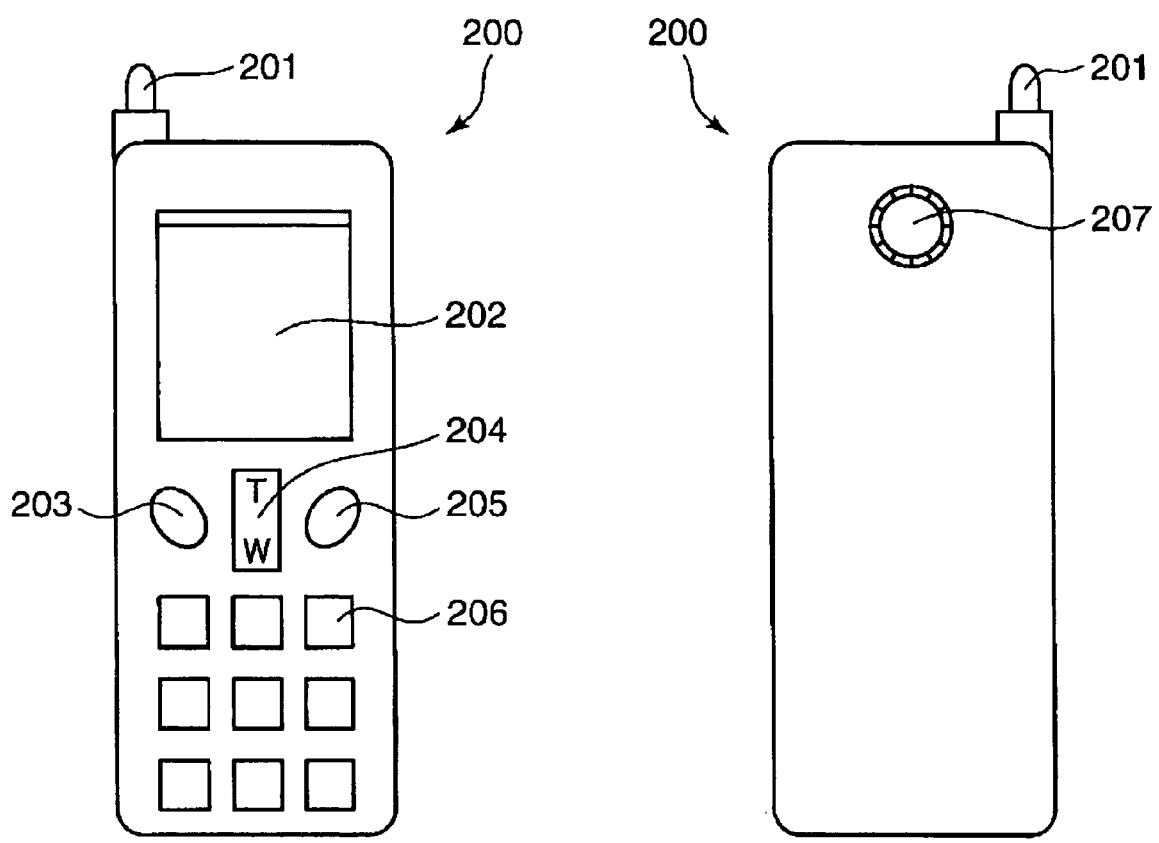
FIG. 10(a) is a configuration view of an outer appearance showing an operating surface of a portable telephone equipped with camera including the variable power optical system according to the present invention.
FIG. 10(b) is a configuration view of the outer appearance showing a back surface of the operating surface of the portable telephone equipped with camera including the variable power optical system according to the present invention.
Figure 17A:
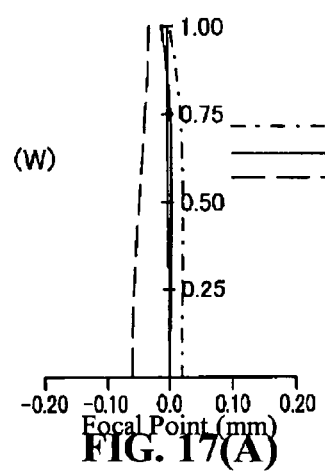
FIGS. 17(a) to 17(i) are aberration diagrams showing spherical aberration, astigmatism and distortion aberration of Embodiment 7.
Figure 17B:
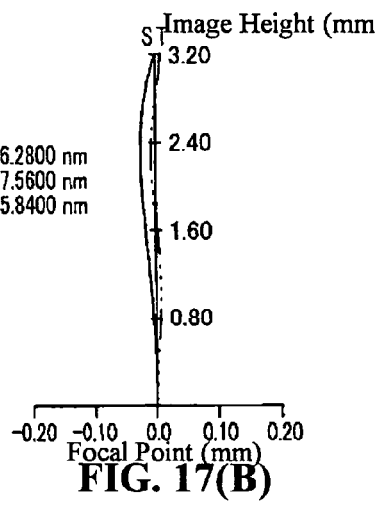
Figure 17C:
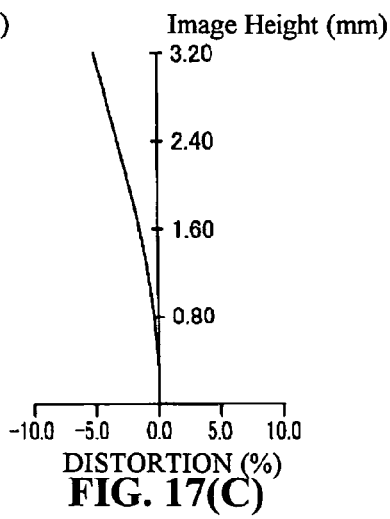
Figure 17D:
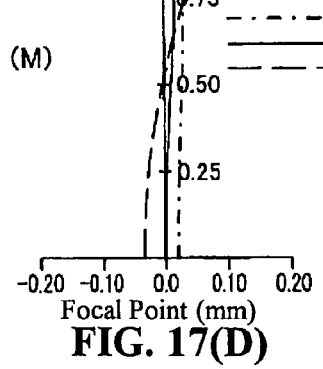
Figure 17E:
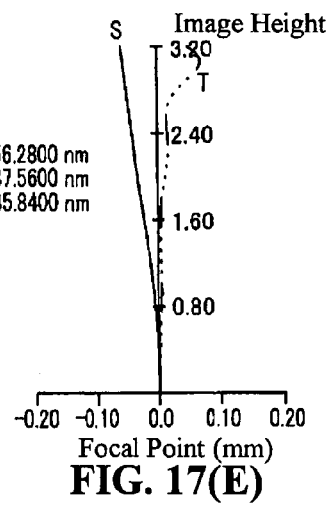
Figure 17F:
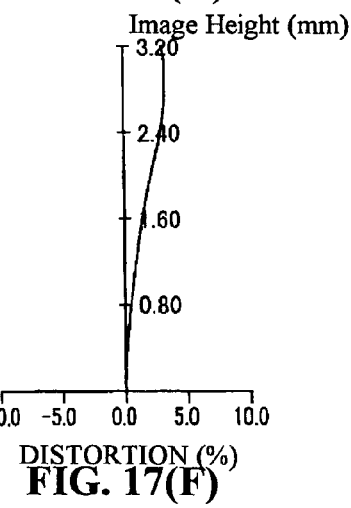
Figure 17G:
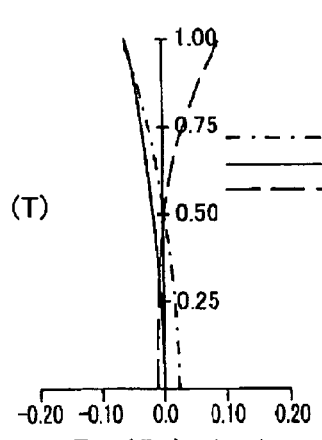
Figure 17H:
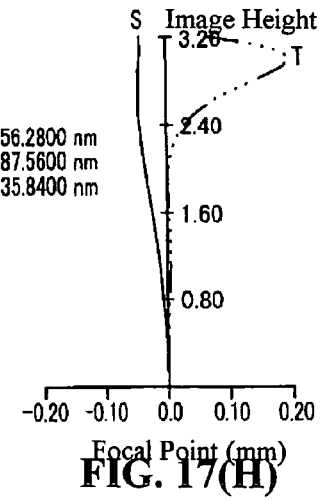
Figure 17I:
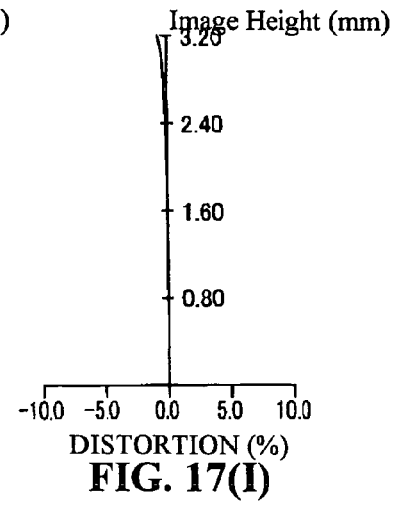

FIG. 10(a) shows the operating surface of the portable telephone, and FIG. 10(b) shows the back surface, that is, the rear surface of the operating surface. The portable telephone body 200 includes an antenna 201 on the upper part, a display 202 on the operating surface, an image switching button 203 for activating the image photographing mode and switching between still image photographing and moving image photographing, a variable power button 204 for controlling the variable power (zooming) according to the present invention, a shutter button 205, and dial buttons 206. The variable power button 204 has "T" representing telephoto printed on the upper end portion and "W" representing wide-angle printed on the lower end portion and is configured by a two-contact switch and the like that, when the printed position is pushed, commands the respective variable power operation. Further, an imaging apparatus (camera) 207 configured by the variable power optical system according to the present invention is interiorly arranged in the portable telephone body 200, and the imaging lens is exposed on the rear surface.

When photographing the still image, the image switching button 203 is first pushed to activate the image photographing mode. The still image photographing mode is activated by pushing the image switching button 203 once, and is switched to the moving image photographing mode by pressing the image switching button 203 one more time. When the still image photographing mode is activated, the image of the subject is periodically and repeatedly imaged by the imaging element such as CCD through the imaging apparatus 207, is transferred to the display memory and is then sent to the display 202. The main subject is adjusted so as to fit in a desired position in the screen by looking at the display 202. The still image is captured, that is, the image data is stored in the memory for still image by pushing the shutter button 205 in this state.

When performing zooming to magnify the subject at a position distant from the photographer or the subject nearby, the printed part "T" of the upper end portion of the variable power button 204 is pushed to detect the relevant state, the lens drive is implemented for variable power according to the time being pushed, and zooming is performed continuously. When desiring to lower the magnification ratio of the subject in the direction of the same size due to too much zooming, the printed part "W" of the lower end portion of the variable power button 204 is pushed to detect the relevant state, and to continuously carry out variable power to the same size according to the time being pushed. Thus, the magnification ratio is adjusted using the variable power button 204 even if the subject is distant from the photographer. The main subject is adjusted so as to fit in a desired position in the screen, and the magnified still image is captured by pushing the shutter button 205.

When photographing the moving image, after pushing the image switching button 203 to activate the still image photographing mode, the image switching button 203 is pushed one more time to switch to the moving image photographing mode. Similar to the still image photographing, the image of the subject obtained through the imaging apparatus 207 is then adjusted so as to fit in the desired position in the screen by looking at the display 202. The magnification ratio of the image of the subject is adjusted using the variable power button 204. The moving image photographing is started by pushing the shutter button 205 in such state. During photographing, the magnification ratio of the subject may be changed as necessary by means of the variable power button 204. The moving image photographing is terminated by pushing the shutter button 205 one more time. The moving image is sent to the display memory for the display 202 and is also sent to and stored in the memory for moving image.

The variable power button 204 according to the present invention is not limited to the above embodiment and an existing dial button 206 may be used, or any form having a function of carrying out variable power in two directions of magnification and de-magnification such as a rotating dial that includes a rotating shaft on a surface arranged with dial buttons may be used.

The present invention is not limited to the portable telephone, and may be applied to other digital equipments such as, digital still camera, digital video camera, personal digital assistant, personal computer, mobile computer and peripheral devices thereof.

The imaging apparatus 207 according to the present invention shown in FIG. 10(b) is configured in the order from the rear surface side or the object (subject) side, a lens system forming an optical image of the object, a parallel plane plate corresponding to an optical low-pass filter and the like, and an imaging element for converting the optical image formed by the lens system to an electric signal. With regards to the lens system, there is a strong demand for a variable power optical system capable of performing zooming, has high-performance and is compact so as to be able to photograph the subject distant from the photographer. In the variable power optical system, a plurality of lens groups configure the lens system, and variable power as well as focusing are carried out by changing the distance between each lens group in the optical axis direction. The present invention relates to the variable power optical system, the imaging apparatus that uses the variable power optical system to form the optical image of the subject on a light receiving surface of the imaging element that converts the optical image to the electric signal, and a digital equipment including the imaging apparatus and the imaging element and having the function of photographing the still image or the moving image.

The variable power optical system according to the present invention configuring the imaging apparatus 207 of the portable telephone equipped with camera shown in FIG. 10(b) will now be explained with reference to the drawings.

Embodiment 1

Figure 1:
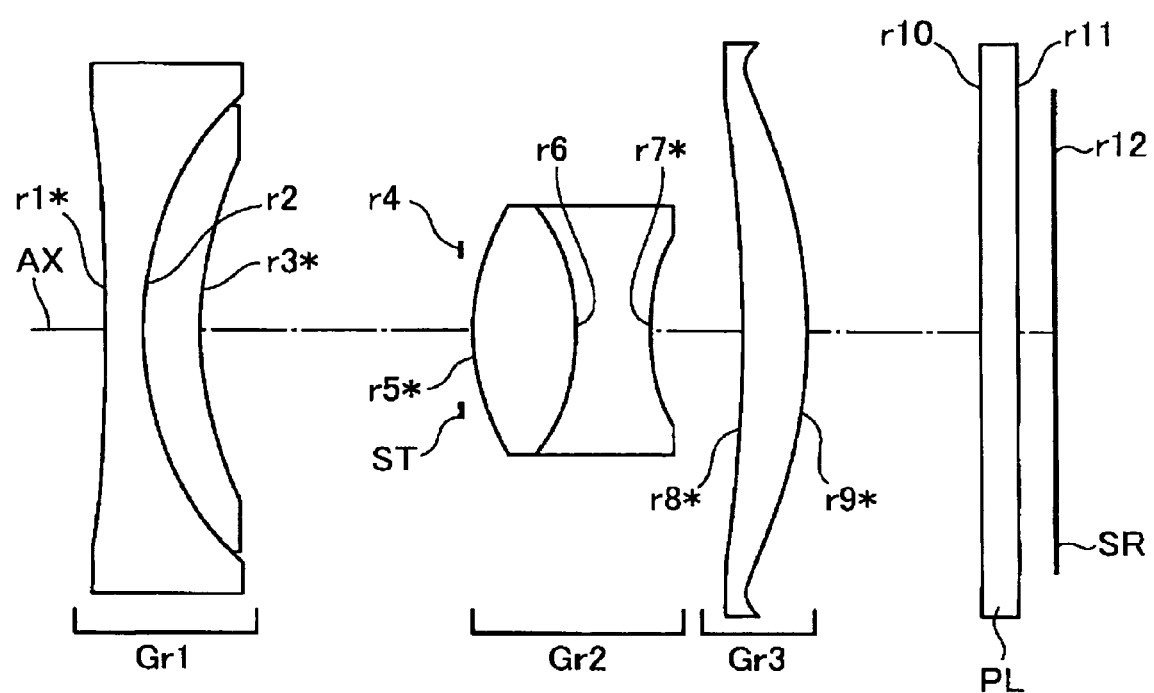
FIG. 1 is a cross sectional view taken longitudinally along an optical axis in a variable power optical system of Embodiment 1.

FIG. 1 is a cross sectional view longitudinally taken along the optical axis (AX) showing an arrangement of lens groups in a variable power optical system of Embodiment 1. In FIG. 1 and FIG. 2 to FIG. 7 explained below, the lens arrangement in wide-angle end (W) is shown. Embodiment 1 is configured by, in the order from the object side (left side in FIG. 1), a first lens group (Gr1) having a negative optical power as a whole, a second lens group (Gr2) having a positive optical power, and a third lens group (Gr3) having a positive optical power. Further, in each embodiment, an optical stop (ST) for adjusting the quantity of light is arranged on the first lens group (Gr1) side of the second lens group (Gr2). A parallel plane plate (PL) and an imaging element (SR) are arranged adjacent to the third lens group (Gr3) on the side away from the second lens group (Gr2) (adjacent to the fourth lens group (Gr4) on the side away from the third lens group (Gr3) in Embodiment 4).

Technical terms such as "concave" "convex" or "meniscus" are used in the present specification, but these terms represent the lens shape in the vicinity of the optical axis (near the center of the lens), and does not represent the shape of the entire lens or near the edge of the lens. This must be paid attention to in the aspherical lens where the shape generally differs between near the center of the lens and near the edge, but is not a problem in a spherical lens. The variable power optical system of Embodiment 1 shown in FIG. 1 has each lens group configured in the following way in the order from the object side. The first lens group (Gr1) having a negative optical power as a whole is a cemented lens of a negative lens (lens having negative optical power) that is concave on both sides, and a positive meniscus lens (lens having positive optical power) that is convex on the object side. The second lens group (Gr2) having a positive optical power as a whole is a cemented lens of a positive lens that is convex on both sides and a negative lens that is concave on both sides. The third lens group (Gr3) having a positive optical power as a whole is a single positive meniscus lens that is convex on the image side. The numbers ri (i=1, 2, 3, ... ) shown in FIG. 1 refers to the $i^{th}$ lens surface counted from the object side (the cementing surface of the lens is counted as one surface), where the surface added with * to ri is an aspherical surface.

The number of lenses in the cemented lens is not one in the entire cemented lens and is represented by the number of lenses of a single lens configuring the cemented lens. For instance, the number of lenses of the cemented lens configured from three single lenses is counted as three and not one.

In such configuration, the rays entering from the object side of the figure pass through the lenses in the order of the first lens group (Gr1), the second lens group (Gr2), and the third lens group (Gr3), and form the optical image of the object. The optical image formed by the lens groups passes through the parallel plane plate (PL) arranged adjacent to the third lens group (Gr3). The optical image is corrected so that the so-called return noise generated when being converted to the electric signal at the imaging element (SR) is minimized. The parallel plane plate (PL) corresponds to an optical low-pass filter, an infrared cut filter, a cover glass of the imaging element and the like. Finally, the optical image corrected at the parallel plane plate (PL) is converted to the electric signal at the imaging element (SR). The electric signal is performed with a predetermined digital image processing or image compression processing and the like as necessary, and is recorded in the memory of for example, the portable telephone or portable digital assistant as the digital picture signal or is transmitted to other digital equipment by wire or by radio.

In the variable power optical system configured from three components in which the optical power is positive, negative, and negative as in the present embodiment, the second lens group (Gr2) mainly carries out variable power. Thus, the second lens group (Gr2) mainly has the optical power. However, in the compact variable power optical system according to the present invention, it is difficult to ensure a variable power ratio of about 2 to 3 times by simply displacing the second lens group (Gr2). Thus, the lens groups other than the second lens group (Gr2) are also configured to perform variable power. In Embodiment 1 of the lens configuration shown in FIG. 1, the first lens group (Gr1) is fixed and the second lens group (Gr2) as well as the third lens group (Gr3) mainly carry out variable power in performing variable power.

Similar to Embodiment 1, the lens configuration of Embodiment 2 to Embodiment 7 will now be explained in sequence with reference to the drawings. The reference characters in FIG. 2 to FIG. 7 denote the same components as in FIG. 1.

Embodiment 2

Figure 2:
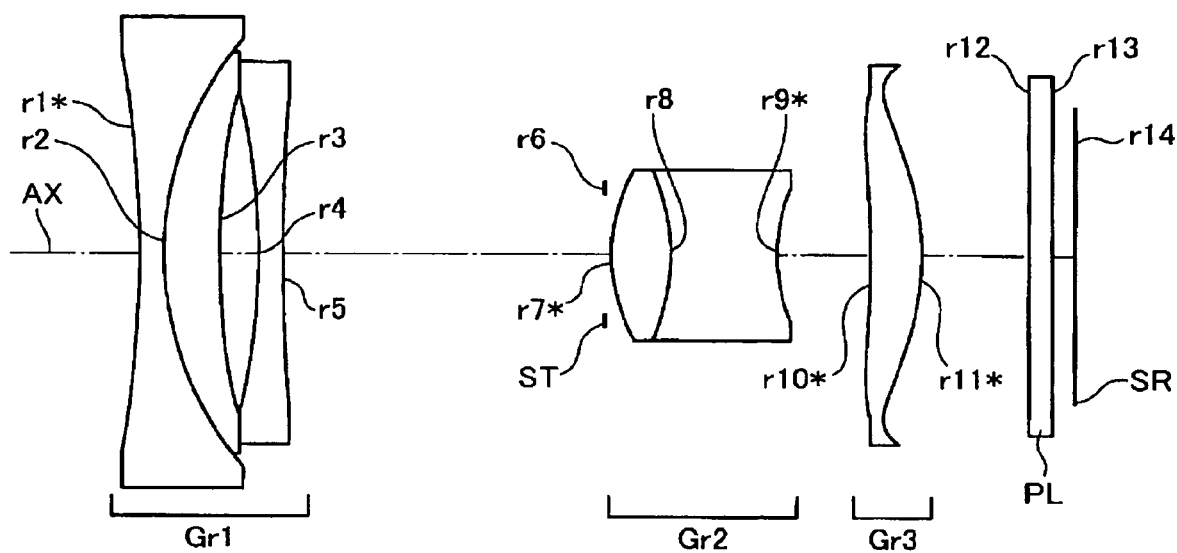
FIG. 2 is a cross sectional view taken longitudinally along an optical axis in a variable power optical system of Embodiment 2.

FIG. 2 is a cross sectional view longitudinally taken along the optical axis (AX) showing an arrangement of lens groups in a variable power optical system of Embodiment 2. The variable power optical system of Embodiment 2 is configured in the following way in the order from the object side. The first lens group (Gr1) having a negative optical power as a whole is configured by a cemented lens of a negative lens that is concave on both sides and a positive meniscus lens that is convex on the object side, and a negative lens that is concave on both sides. The second lens group (Gr2) having a positive optical power as a whole is a cemented lens of a positive lens that is convex on both sides and a negative lens that is concave on both sides. The third lens group (Gr3) having a positive optical power as a whole is a single positive meniscus lens that is convex on the image side.

In Embodiment 2 of such lens configuration, all of the first lens group (Gr1), the second lens group (Gr2) and the third lens group (Gr3) are displaced when performing variable power, and all such lens groups carry out variable power and aberration correction.

Embodiment 3

Figure 3:
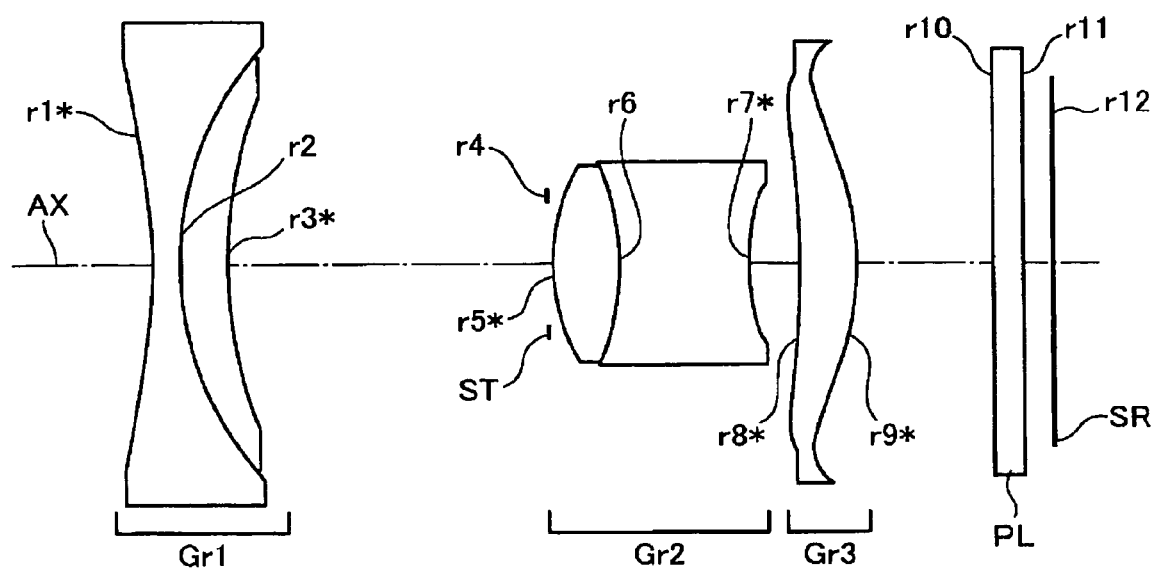
FIG. 3 is a cross sectional view taken longitudinally along an optical axis in a variable power optical system of Embodiment 3.

FIG. 3 is a cross sectional view longitudinally taken along the optical axis (AX) showing an arrangement of lens groups in a variable power optical system of Embodiment 3. The variable power optical system of Embodiment 3 shown in FIG. 3 has each lens group configured in the following way in the order from the object side. The first lens group (Gr1) having a negative optical power as a whole is a cemented lens of a negative lens that is concave on both sides, and a positive meniscus lens that is convex on the object side. The second lens group (Gr2) having a positive optical power as a whole is a cemented lens of a positive lens that is convex on both sides and a negative lens that is concave on both sides. The third lens group (Gr3) having a positive optical power as a whole is a single positive meniscus lens that is convex on the image side.

In Embodiment 3 of such lens configuration, all of the first lens group (Gr1), the second lens group (Gr2) and the third lens group (Gr3) are displaced when performing variable power, and all such lens groups carry out variable power and aberration correction.

Embodiment 4

Figure 4:
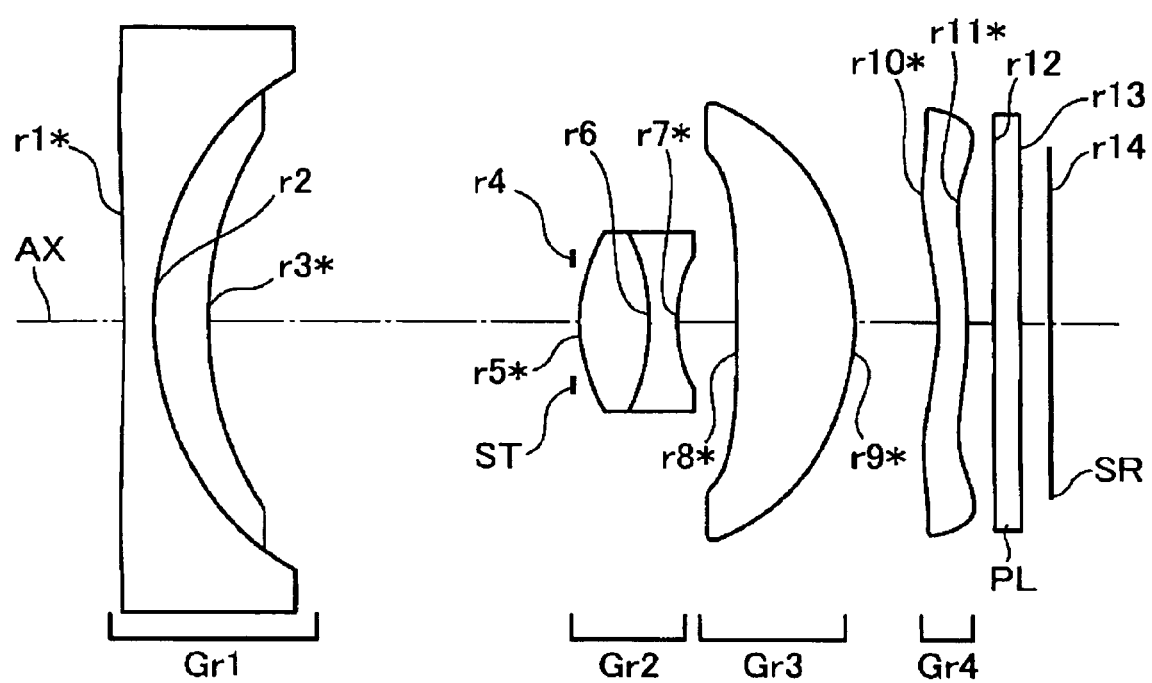
FIG. 4 is a cross sectional view taken longitudinally along an optical axis in a variable power optical system of Embodiment 4.

FIG. 4 is a cross sectional view longitudinally taken along the optical axis (AX) showing an arrangement of lens groups in a variable power optical system of Embodiment 4. Embodiment 4 shown in FIG. 4 differs from other embodiments in that a fourth lens group (Gr4) having a negative optical power is further arranged. The variable power optical system of Embodiment 4 has each lens group configured in the following way in the order from the object side. The first lens group (Gr1) having a negative optical power as a whole is a cemented lens of a negative lens that is concave on both sides, and a positive meniscus lens that is convex on the object side. The second lens group (Gr2) having a positive optical power as a whole is a cemented lens of a positive lens that is convex on both sides and a negative lens that is concave on both sides. The third lens group (Gr3) having a positive optical power as a whole is a single positive meniscus lens that is convex on the image side. The fourth lens group (Gr4) having a negative optical power as a whole is a single negative meniscus lens that is convex on the image side.

In Embodiment 4 of such lens configuration, all of the first lens group (Gr1), the second lens group (Gr2) and the third lens group (Gr3) are displaced when performing variable power, and all such lens groups carry out variable power and aberration correction. The fourth lens group (Gr4) is fixed.

Embodiment 5

Figure 5:
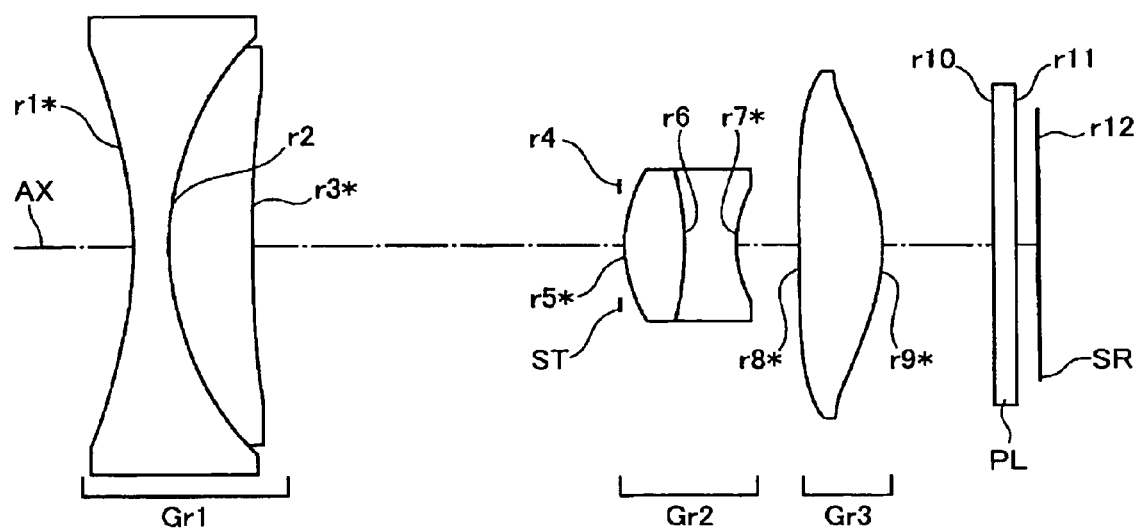
FIG. 5 is a cross sectional view taken longitudinally along an optical axis in a variable power optical system of Embodiment 5.

FIG. 5 is a cross sectional view longitudinally taken along the optical axis (AX) showing an arrangement of lens groups in a variable power optical system of Embodiment 5. The variable power optical system of Embodiment 5 has each lens group configured in the following way in the order from the object side. The first lens group (Gr1) having a negative optical power as a whole is a cemented lens of a negative lens that is concave on both sides and a positive meniscus lens that is convex on the object side. The second lens group (Gr2) having a positive optical power as a whole is a cemented lens of a positive lens that is convex on both sides and a negative lens that is concave on both sides. The third lens group (Gr3) having a positive optical power as a whole is a single positive lens that is convex on both sides.

In Embodiment 5 of such lens configuration, all of the first lens group (Gr1), the second lens group (Gr2) and the third lens group (Gr3) are displaced when performing variable power, and all such lens groups carry out variable power and aberration correction.

Embodiment 6

Figure 6:
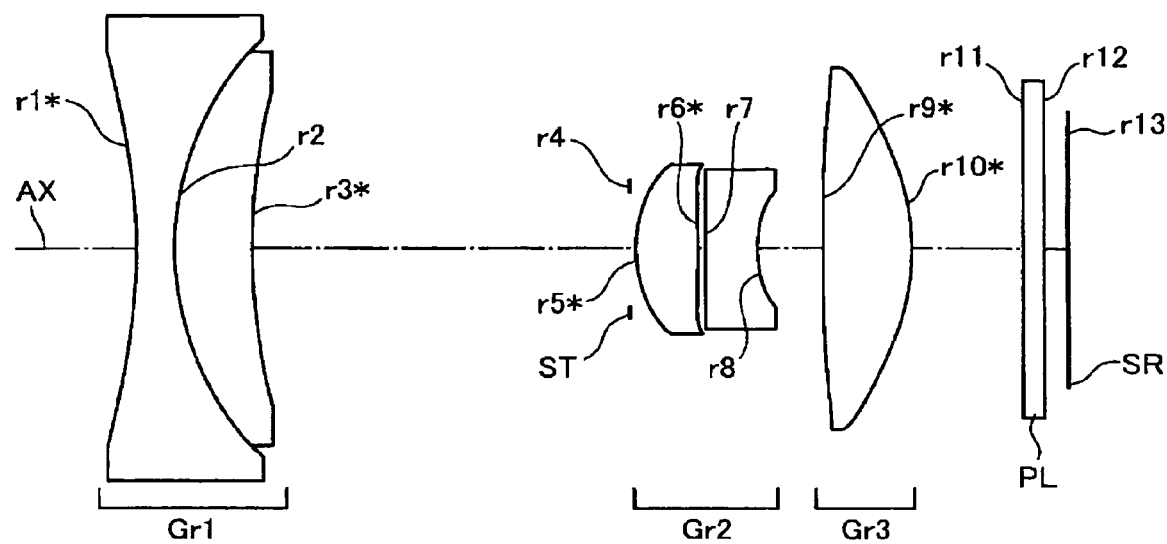
FIG. 6 is a cross sectional view taken longitudinally along an optical axis in a variable power optical system of Embodiment 6.

FIG. 6 is a cross sectional view longitudinally taken along the optical axis (AX) showing an arrangement of lens groups in a variable power optical system of Embodiment 6. The variable power optical system of Embodiment 6 has each lens group configured in the following way in the order from the object side. The first lens group (Gr1) having a negative optical power as a whole is a cemented lens of a negative lens that is concave on both sides, and a positive meniscus lens that is convex on the object side. The second lens group (Gr2) having a positive optical power as a whole is a cemented lens of a positive lens that is convex on both sides and a negative lens that is convex on the object side. The third lens group (Gr3) having a positive optical power as a whole is a single positive lens that is convex on both sides.

In Embodiment 6 of such lens configuration, all of the first lens group (Gr1), the second lens group (Gr2) and the third lens group (Gr3) are displaced when performing variable power, and all such lens groups carry out variable power and aberration correction.

Embodiment 7

Figure 7:
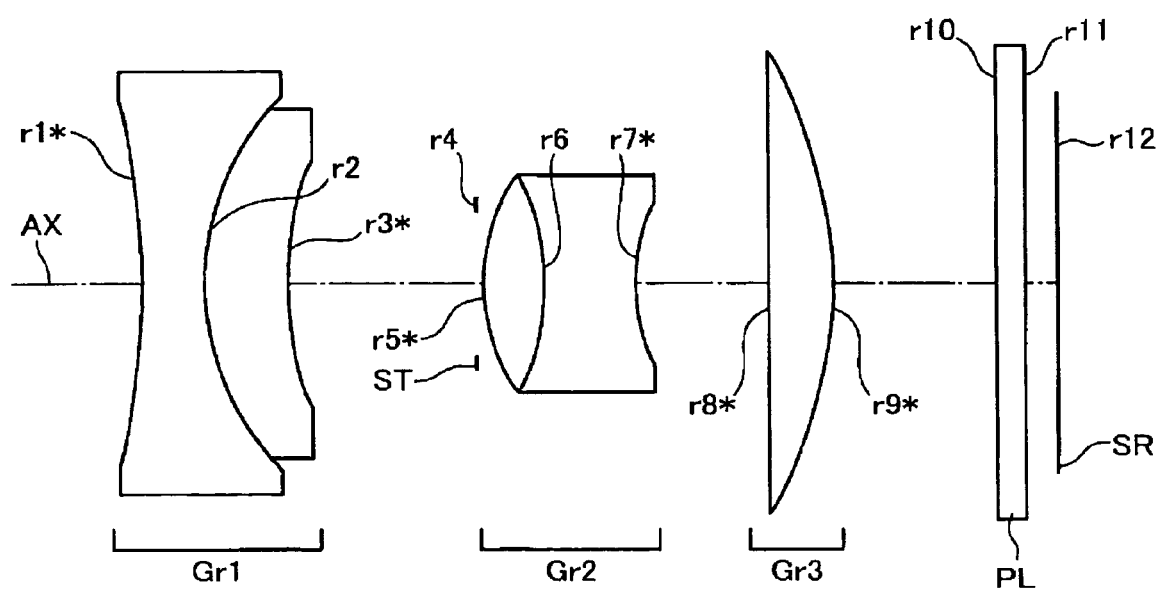
FIG. 7 is a cross sectional view taken longitudinally along an optical axis in a variable power optical system of Embodiment 7.

FIG. 7 is a cross sectional view longitudinally taken along the optical axis (AX) showing an arrangement of lens groups in a variable power optical system of Embodiment 7. The variable power optical system of Embodiment 7 has each lens group configured in the following way in the order from the object side. The first lens group (Gr1) having a negative optical power as a whole is a cemented lens of a negative lens that is concave on both sides, and a positive meniscus lens that is convex on the object side. The second lens group (Gr2) having a positive optical power as a whole is a cemented lens of a positive lens that is convex on both sides and a negative lens that is concave on both sides. The third lens group (Gr3) having a positive optical power as a whole is a single positive meniscus lens that is convex on the image side.

In Embodiment 7 of such lens configuration, all of the first lens group (Gr1), the second lens group (Gr2) and the third lens group (Gr3) are displaced when performing variable power, and all such lens groups carry out variable power and aberration correction.

The conditions of the optical property or the conditions required for the lens system configuring the variable power optical system according to the present invention will now be given, and the basis of the conditions (or basis of numerical range) will be explained.

In the variable power optical system including the first lens group (Gr1) having a negative optical power, the second lens group (Gr2) having a positive optical power, and the third lens group (Gr3) having a positive optical power, arranged in such order from the object side, and where the distance between the first lens group (Gr1) and the second lens group (Gr2) is narrowed when carrying out variable power from the wide-angle end to telephoto end, the first lens group (Gr1) is configured from less than or equal to three lenses including the cemented lens, and at least one aspherical surface is arranged on the second lens group (Gr2) as in each embodiment, the following condition is desirably satisfied.

$$0.5 < f_2 / f_3 < 2 \quad (1)$$

where, $f_2$: total focal length of the second lens group (Gr2)
$f_3$: total focal length of the third lens group (Gr3)

When above the upper limit of equation (1), the displacement amount of the second lens group (Gr2) increases since the optical power of the second lens group (Gr2) is weak. When below the lower limit of equation (1), the displacement amount of the third lens group (Gr3) increases since the optical power of the third lens group (Gr3) is weak. In either case, the entire optical length increases.

Further, in the variable power optical system described above, the total focal lengths of the second lens group (Gr2) and the entire optical system desirably satisfy the following condition.

$$0.7 < f_2 / f_w < 2 \quad (2)$$

where, fw: total focal length of the entire optical system at the wide-angle end (W).

When above the upper limit of equation (2), the optical power of the second lens group (Gr2) becomes too weak and becomes difficult to obtain a variable power ratio of about two to three times. Further, when below the lower limit of equation (2), decentration error sensitivity of the second lens group (Gr2) becomes high, and manufacturing becomes difficult.

The total focal lengths of the second lens group (Gr2) and the entire system more desirably satisfy the following equation.

$$1 < f_2 / f_w < 1.8 \quad (2)'$$

When above the upper limit of equation (2)', the displacement amount of the second lens group (Gr2) when carrying out variable power increases as the optical power of the second lens group (Gr2) is weak and the entire optical length becomes long. Further, when below the lower limit of equation (2)', decentration error sensitivity of the second lens group (Gr2) becomes high, adjustment between lenses within the second lens group (Gr2) or adjustment with other lens groups become necessary, thereby leading to increase in cost.

In the above mentioned variable power optical system, when the cemented lens of the first lens group (Gr1) is configured by two lenses of a negative lens and a positive lens in the order from the object side, the Abbe number of the first lens group (Gr1) desirably satisfies the following equation.

$$|v_{1n} - v_{1p}| > 15 \quad (3)$$

where, $v_{1n}$: Abbe number of negative lens in the first lens group (Gr1)
$v_{1p}$: Abbe number of positive lens in the first lens group (Gr1)

When below the lower limit of equation (3), correction of chromatic aberration of magnification in the first lens group (Gr1) becomes insufficient and the contrast lowers.

In the variable power optical system including the first lens group (Gr1) having a negative optical power, the second lens group (Gr2) having a positive optical power, and third lens group (Gr3) having a positive optical power, arranged in such order from the object side, where the distance between the first lens group (Gr1) and the second lens group (Gr2) is narrowed when carrying out variable power from the wide-angle end to the telephoto end; the first lens group (Gr1) is configured from less than or equal to three lenses including the cemented lens; and at least one surface of aspherical surface is arranged on the second lens group (Gr2), the total focal lengths of the first lens group (Gr1) and the entire optical system desirably satisfy the following condition.

$$1 < |f_1 / f_w| < 4 \quad (4)$$

where, $f_1$: total focal length of the first lens group (Gr1)

$f_w$: total focal length of the entire optical system at the wide-angle end (W)

When above the upper limit of equation (4), the correction of astigmatism and distortion aberration particularly at the wide-angle end becomes insufficient. When below the lower limit of equation (4), the optical power of each lens configuring the first lens group (Gr1) becomes strong and manufacturing becomes difficult. Further, the influence of chromatic aberration of magnification becomes greater and the correction thereof becomes difficult.

The total focal lengths of the first lens group (Gr1) and the entire optical system more desirably satisfy the following condition.

$$1.5 < |f_1/f_w| < 3.5 \tag{4}'$$

When above the upper limit of equation (4)', the negative optical power of the first lens group (Gr1) becomes weak and the front cell diameter increases. On the other hand, when below the lower limit of equation (4)', the optical power of the first lens group (Gr1) becomes strong, the error sensitivity of the first lens group (Gr1) particularly at the telephoto end (T) becomes high and adjustment between lenses becomes necessary.

In the above mentioned variable power optical system, the focal length within the first lens group (Gr1) desirably satisfies the following condition.

$$0.3 < |f_{1n}/f_{1p}| < 0.8 \tag{5}$$

where, $f_{1p}$: total focal length of the positive lens in the cemented lens of the first lens group (Gr1)

$f_{1n}$: total focal length of the negative lens in the cemented lens of first lens group (Gr1)

When the ratio of the focal length is above the upper limit of equation (5), correction of astigmatism and distortion aberration particularly at the wide-angle end (W) becomes insufficient. When the ratio is below the lower limit of equation (5), on the other hand, the optical power of each lens configuring the first lens group (Gr1) becomes high and manufacturing becomes difficult. Further, the influence of the chromatic aberration of magnification becomes greater and the correction thereof also becomes difficult.

In the above mentioned variable power optical system, the total focal lengths of the second lens group (Gr2) and the entire optical system desirably satisfy the following condition.

$$0.1 < f_2/f_T < 0.9 \tag{6}$$

where, $f_T$: total focal length of the entire optical system at the telephoto end (T)

When above the upper limit of equation (6), the optical power of the second lens group (2) becomes too weak and a variable power ratio of about two to three times becomes difficult to obtain. When below the lower limit of equation (6), error sensitivity of the second lens group (Gr2) becomes high and manufacturing becomes difficult.

Further, the total focal lengths of the second lens group (Gr2) and the entire optical system more desirably satisfy the following condition.

$$0.3 < f_2/f_T < 0.7 \tag{6}'$$

When above the upper limit of equation (6)', the displacement amount of the second lens group (Gr2) increases as the optical power of the second lens group (Gr2) is weak, and the entire optical length becomes long. Further, when below the lower limit of equation (6)', decentration error sensitivity of the second lens group (Gr2) becomes high, and adjustment between lenses in the second lens group (Gr2) and adjustment with the other lens group become necessary, thereby leading to increase in cost.

Further, in the above mentioned variable power optical system, the following condition is desirably satisfied.

$$0.1 < Y'/TL < 0.5 \tag{7}$$

where,

Y': radius of effective image circle

TL: maximum value on optical axis from the surface vertex of the lens surface closest to the object to the image plane over the entire variable power region When above the upper limit of equation (7), the displacement amount of the second lens group (Gr2) responsible for carrying out variable power becomes small, and thus the optical power required for the second lens group (Gr2) becomes strong and it becomes difficult to satisfy the manufacturing requirements such as curvature radius of each lens of the second lens group (Gr2). When below the lower limit of equation (7), the entire optical length becomes long, and it becomes difficult to mount onto digital equipment such as the portable telephone in terms of size.

In the above mentioned variable power optical system, the following condition is more desirably satisfied.

$$0.13 < Y'/TL < 0.3 \tag{7}'$$

When above the upper limit of equation (7)', the optical power of the second lens group (Gr2) becomes strong, and the error sensitivity in the second lens group (Gr2) increases. When below the lower limit of equation (7)', the size of the optical system increases, and further, the load of the lens drive system involved in increase in displacement amount when carrying out variable power becomes large, and as a result, the lens drive device becomes larger.

In the above mentioned variable power optical system, the following condition is desirably satisfied.

$$0.2 < f_W/T_W < 0.5 \tag{8}$$

where, $T_w$: distance on optical axis from the surface vertex of the lens surface closest to the object to the image plane at the wide-angle end (W)

The astigmatism worsens when above the upper limit of equation (8). When below the lower limit of equation (8), the entire optical length becomes long, and it becomes difficult to mount onto digital equipment such as a portable telephone in terms of size.

Further, in the above mentioned variable power optical system, the following condition is desirably satisfied.

$$0.5 < f_T/T_T < 1 \tag{9}$$

where, $T_T$: distance on optical axis from the surface vertex of the lens surface closest to the object to the image plane at the telephoto end (T)

When above the upper limit of equation (9), the displacement amount of the second lens group (Gr2) is limited, and thus the variable power ratio of about two to three times becomes difficult to obtain. When below the lower limit of equation (9), the entire optical length becomes long and it becomes difficult to mount onto digital equipment such as portable telephone in terms of size. In the above mentioned variable power optical system, the second lens group (Gr2) is configured by a positive lens and a negative lens arranged in such order from the object side, and desirably satisfies the following condition.

$$|v_{2n}-v_{2p}|>10 \quad (10)$$

where, $v_{2n}$: Abbe number of the negative lens in second lens group (Gr2)

$v_{2p}$: Abbe number of the positive lens in second lens group (Gr2)

When below the lower limit of equation (10), the correction of longitudinal chromatic aberration in the second lens group (Gr2) becomes insufficient and the axial contrast lowers.

In the variable power optical system, the focal length in the second lens group (Gr2) desirably satisfies the following condition.

$$0.9<|f_{2n}/f_{2p}|<1.5 \quad (11)$$

where, $f_{2p}$: focal length of the positive lens in the second lens group (Gr2)

$f_{2n}$: focal length of the negative lens in the second lens group (Gr2)

When above the upper limit of equation (11), the spherical aberration lacks correction. Further, when below the lower limit of equation (11), the optical power of each lens of the second lens group (Gr2) becomes strong, and thus error sensitivity becomes high and productivity worsens.

In the above mentioned variable power optical system, the total focal length of the first lens group (Gr1) and the entire optical system desirably satisfy the following equation.

$$0.5<|f_1/f_T|<1.3 \quad (12)$$

When the ratio of the focal length is above the upper limit of equation (12), the correction of astigmatism and distortion aberration particularly at the wide-angle end (W) becomes insufficient. On the other hand, when the ratio is below the lower limit of equation (12), the optical power of each lens configuring the first lens group (Gr1) becomes high and manufacturing becomes difficult. Further, the influence of chromatic aberration of magnification becomes greater, and the correction thereof also becomes difficult.

In the above mentioned variable power optical system, among the incident rays into the imaging surface, the incidence angle of the principal ray at the diameter of the effective image circle desirably satisfies the following condition.

$$\alpha_W>0 \quad (13)$$

where, $\alpha_W$: angle (degree (deg)) with respect to a perpendicular line on the image plane of the principal ray at the wide-angle end.

Figure 8:
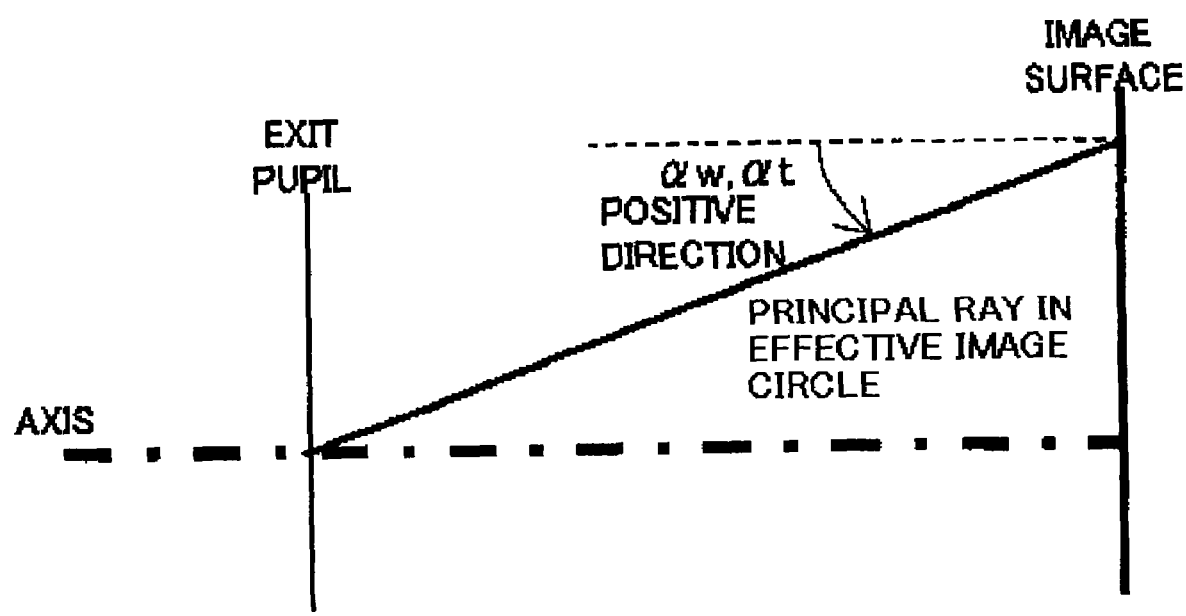
FIG. 8 is a frame format view showing a definition of an incident angle into an image plane of principle rays.

The angle defines the direction shown in FIG. 8 as the positive direction. That is, with the left side of FIG. 8 as the object side and the right side as the image plane side, the angle measured from the perpendicular line arranged on the image plane in the counterclockwise direction with respect to the principal ray at the diameter of the effective image circle extending from the exit pupil position is αw. By satisfying equation (13), compactness is achieved while ensuring wide field angle.

In the above mentioned variable power optical system, among the incident rays into the imaging surface, the incidence angle of the principal ray at the diameter of the effective image circle desirably satisfies the following condition.

$$|\alpha_W-\alpha_T|<30 \quad (14)$$

where, $\alpha_T$: angle (degree (deg)) with respect to the perpendicular line on the image plane of the principal ray at the telephoto end As shown in FIG. 8, similar to αw, $\alpha_T$ also defines the counterclockwise direction as the positive direction with the perpendicular line on the image plane as the reference. By satisfying equation (14), the lowering of ambient illuminance is suppressed even when the lens array is arranged in front of the imaging surface.

In the above mentioned variable power optical system, the index of refraction of the configuring lens desirably satisfies the following condition.

$$\Delta N_{max}>0.3 \quad (15)$$

where, $\Delta N_{max}$: maximum value of the difference in index of refraction of the configuring lenses By satisfying equation (15), the Petzval sum is made small and the astigmatism is satisfactorily corrected.

Further, in the above mentioned variable power optical system, the index of refraction of the configuring lens desirably satisfies the following condition.

$$N>1.8 \quad (16)$$

where,

N: index of refraction of the lens having the largest index of refraction of the configuring lenses.

By satisfying equation (16), the curvature radius of the lens for obtaining the same optical power is made small, and thus fabrication is facilitated and production of aberration is suppressed. The optical power is strong if the curvature radius is the same and thus the entire optical system is made compact.

The above mentioned variable power optical system is configured to include negative, positive, positive lens groups in the order from the object side. Thus, compared to the optical system of two components of positive and negative lens groups, the displacement amount of the second lens group is small, and further, the incidence angle of the off-axis rays into the light receiving surface of the imaging element can be controlled by the third lens group. Here, the optical power of the third lens group is small compared to the other lens groups, and thus does not greatly contribute to aberration correction, and functions in a configuration of one or two lenses.

In the configuration including three lens groups of negative, positive, positive in the order from the object side, the aspherical surface is desirably arranged on one surface of the lens configuring at least one of the first lens group and the third lens group.

In a configuration in which the optical power of the lens group is negative, positive, positive in the order from the object side, the first lens group or the third lens group mainly relates to the off-axis aberration. Therefore, according to such configuration, the off-axis aberration is satisfactorily corrected by applying the aspherical surface on the first lens group or the third lens group.

Further, in a configuration in which the optical power is negative and positive in the order from the object side, the second lens group is desirably configured from at least one positive lens and at least one negative lens. When configured including negative and positive lens groups in the order from the object side, the second lens group mainly relates to the axial aberration. The axial aberration is satisfactorily corrected by using at lest one positive lens and negative lens in the second lens group.

Desirably, the optical stop is arranged between the first lens group and the second lens group, which optical stop is displaced towards the object side along with the second lens group when carrying out variable power from the wide-angle end to the telephoto end. In carrying out variable power from the wide-angle end to the telephoto end, the optical stop is displaced with the second lens group having the largest displacement amount, and thus the effective increase in the outer diameter of the lens of the second lens group is suppressed. Further, a driving device dedicated to the optical stop does not need to be arranged, and thus the configuration of the lens driving device is simplified.

Desirably, the optical stop is arranged between the first lens group and the second lens group, which optical stop is displaced towards the object side alone when carrying out variable power from the wide-angle end to the telephoto end. According to such configuration, the optical stop is responsible for carrying out variable power when carrying out variable power from the wide-angle end to the telephoto end. The optical stop is displaced independent from the second lens group having the largest displacement amount, and thus controls the incidence angle of the off-axis rays into the imaging element.

Further, the second lens group (Gr2) or the lens group closer to the image side than the second lens group is desirably displaced alone or in a plurality of groups for focusing. The variable power optical system according to the present invention is compact in size and mountable to the portable telephone and the like. Therefore, performing focusing by projecting the first lens group (Gr1) is a disadvantage in terms of the entire optical length. When focusing with the first lens group (Gr1), the front cell diameter is increased to ensure ambient quantity of light, which is not desirable.

The first lens group is desirably configured only by the cemented lens. According to such configuration, a supporting member necessary for fixing the lens or a lens driving device does not need to be arranged in pluralities in the first lens group, and thus the mechanical mechanism is simplified. Further, the optical performance of the lens is maintained at a cemented state of the lenses and not at the mechanical precision of the supporting member for fixing the lenses. The increase in decentration error sensitivity in the first lens group is suppressed through cementing.

All lens groups are desirably configured only by a single lens or a cemented lens. According to such configuration, a supporting member necessary for fixing the lens or a lens driving device does not need to be arranged in pluralities in any of the lens groups, and thus the mechanical mechanism is simplified.

All the lens surfaces facing the air are desirably an aspherical surface. Generally, the optical performance of the lens group also depends on the difference of index of refraction between the relevant lens group and the adjacent object. Therefore, according to such configuration, the effect of the aspherical surface is effectively exhibited, and both advantages of having the optical system compact and obtaining a high-quality image performed with aberration correction are achieved.

Variable power is desirably performed by displacing three or more lens groups in the direction of the optical axis. In the negative lead optical system of negative-positive or negative-positive-positive lens groups according to the present invention, the second lens group is responsible for carrying out variable power. However, when the entire optical length becomes short, the variable power ratio of about two to three times becomes difficult to obtain by simply displacing the second lens group. Thus, the lens groups other than the second lens group are also configured so as to carry out variable power. Further, three or more lens groups in total are configured so as to be displaceable to have lens groups other than the above carry out optical correction.

In the above mentioned variable power optical system, all lenses may be configured by a resin (plastic) material. Plastic lens generally has small index of refraction compared to the glass lens, and thus is slightly disadvantageous in terms of compactness and high-quality image, but is satisfactory in terms of cost and productivity in that it may be taken out in pluralities and in that the metal mold has long life span.

In the present embodiment, the third lens group (Gr3) is configured by one positive lens, but may be configured by two lenses to more fully perform aberration correction. Here, such lenses may be arranged so as to have air gap in between, or may be arranged with gas or liquid in between and the lens surfaces closely attached together. Further, the lenses may be securely combined to become a cemented lens.

Further, in the present embodiment, the first lens group (Gr1) and the third lens group (Gr3) both include the aspherical surface, but are not limited thereto, and only one of the lens group needs to include the aspherical surface. This is because in the variable power optical system according to the present invention, the first lens group (Gr1) and the third lens group (Gr3) exhibit similar effects, that is, they both perform correction on off-axis aberration. It is to be noted that in the present invention, since the optical power of the first lens group is stronger, a configuration in which the first lens group includes the aspherical surface is more desirable for performing a more satisfactory aberration correction. On the other hand, if the lens configuration is changed and the third lens group has a stronger optical power than the first lens group, the configuration in which the third lens group includes the aspherical surface is more desirable.

The exit pupil position at the wide-angle end (W) is desirably arranged towards the object side than the imaging element surface. Thus, compactness is achieved while maintaining wide field angle.

The present embodiment is a continuous variable power optical system, but is not limited thereto, and to achiever a further compactness, two-focus switching optical system with the same optical configuration may be provided.

In the above mentioned embodiment, a mechanical shutter having the function of performing light shielding with respect to the imaging element (SR) may be arranged as the optical stop (ST). The mechanical shutter is also effective for preventing smears when using CCD as the imaging element for example.

A refractive lens for polarizing the incident rays by refraction effect (that is, lens of a type in which polarization is carried out at the interface between media having different index of refraction) is used in the variable power optical system configuring each embodiment, but the lenses that may be used is not limited thereto. For example, the diffractive lens for polarizing the incident rays by diffraction effect, refractive/diffractive hybrid lens for polarizing the incident rays by a combination of the diffraction effect and the refraction effect, the gradient index lens for polarizing the incident rays by a refractive index profile in the medium, and the like may be used. In addition to the optical stop (ST), a luminous flux regulating plate and the like may be arranged as necessary.

As explained above, the present invention relates to a micro-miniature, inexpensive, high-definition variable power optical system. The entire optical system is configured by lens groups of two or more components and variable power is performed by changing the distance between each lens group in the optical axis direction.

As shown in the above embodiments, the first lens group (Gr1) closest to the object is desirably made up of less than or equal to three lenses and more desirably of two lenses. If the number of lenses is less than the above, correction of astigmatism, distortion aberration and chromatic aberration of magnification becomes difficult and error sensitivity of the lens becomes high. In order to improve such problems, the optical power of the first lens group (Gr1) must be weakened, but in such case, the front cell diameter increases and the entire optical system cannot be made small. On the other hand, if the number of lenses of the first lens group (Gr1) is greater than or equal to four, the cost increases, and further, the lens that has a larger outer diameter and thus is heavier increases although the displacement amount is small, and thus the driving device for displacing such lens group becomes large. The first lens group (Gr1) of the present embodiment is thus configured by two lenses.

The first lens group (Gr1) desirably includes a cemented lens configured by two or more lenses. The error sensitivity of the lens is not reduced by simply arranging a plurality of lenses in a contacting manner, but the error sensitivity is reduced when securely combining, that is, cementing the lenses.

The above mentioned first lens group (Gr1) desirably includes at least one aspherical surface. When the first lens group (Gr1) includes the aspherical surface, mainly the correction of astigmatism and distortion aberration is effectively carried out.

Further, the second lens group (Gr2) desirably includes at least one aspherical surface. When the second lens group (Gr2) includes the aspherical surface, mainly the correction of spherical aberration is effectively carried out.

The cemented lens of the first lens group (Gr1) is further desirably configured from at least one negative lens and at least one positive lens arranged in the order from the object side. This is to adopt the so-called retro focus, to easily maintain back focus at the wide-angle end (W), and to effectively carry out off-axis aberration correction of wide field angle rays. Further, the object side of the positive lens is desirably a convex surface. This is to satisfactorily correct astigmatism and to improve image plane.

The second lens group (Gr2) positioned next to the first lens group (Gr1) is also desirably configured by two lenses. When the number of lenses is less than two, correction of spherical aberration, coma aberration and longitudinal chromatic aberration becomes difficult and the error sensitivity of the lens becomes high. On the other hand, if the number of lenses of the second lens group (Gr2) is greater than three, the cost increases, and further, the weight increases. The load imposed on the driving device thereby becomes large since the second lens group (Gr2) has the largest displacement amount compared to the other lens groups.

The second lens group (Gr2) is desirably configured by a positive lens and a negative lens arranged in the order from the object side. This is to reduce the substantial optical power of the second lens group (Gr2) and to reduce error sensitivity while maintaining variable power operations by approaching the principle point position of the second lens group (Gr2) to the first lens group (Gr1). Further, the positive lens more desirably includes a convex surface on both surfaces. This is to increase the optical power of the second lens group (Gr2) and to reduce the displacement amount of the second lens group (Gr2) when carrying out variable power.

The third lens group (Gr3) closest to the imaging element is desirably a positive lens. This is to approach the incidence angle of the off-axis rays into the light receiving surface of the imaging element (SR) telecentrically.

One example of a specific embodiment of an imaging apparatus including the variable power optical system according to the present invention will now be explained with reference to the figures.

Figure 9:
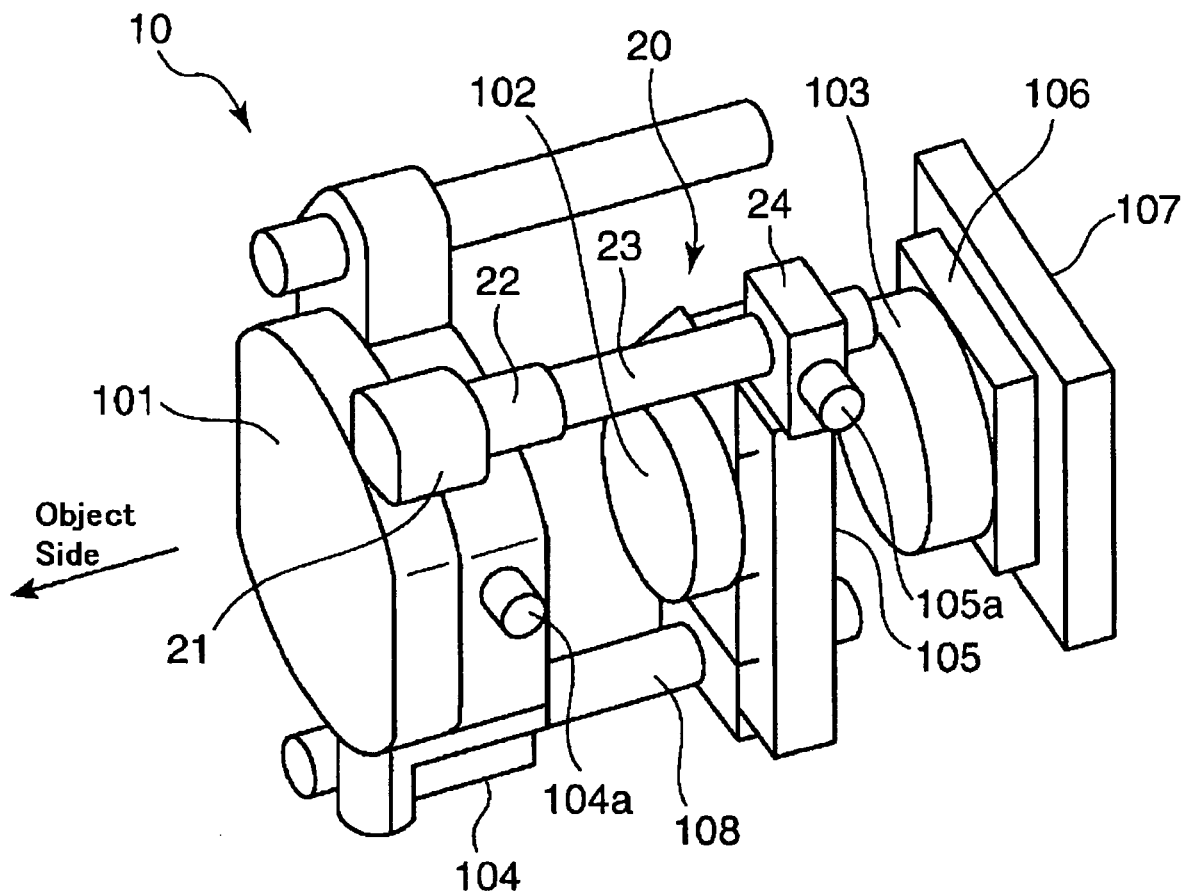
FIG. 9 is a perspective view showing one example of an inner configuration of an imaging apparatus including the variable power optical system according to the present invention and an imaging element.

FIG. 9 is a perspective view showing one example of an inner configuration of the imaging apparatus 10. It is to be noted that other than the imaging apparatus including the lens groups configuring the variable power optical system, the driving device of the lens groups and the like, the imaging elements (not shown) are also included. In the present embodiment, the variable power optical system is assumed to be configured by three lens groups. Further, it is assumed that the first lens group 101 and the second group lens 102 are displaced to perform variable power and focusing when carrying out variable power, and the position of the third lens group 103 is fixed.

As shown in the figure, the imaging apparatus 10 is configured with the first lens group 101, the second lens group 102, and the third lens group 103 arranged from the subject (object) side with the respective optical axis coinciding each other. The first, the second and the third lens groups 101 to 103 are supported by the supporting members 104 to 106, respectively. The parallel plane plate and the imaging elements (not shown) are supported at the fixed member 107, and fixed at the central portion of the fixed member 107. The third lens group 103 and the supporting member 106 thereof are fixed at the fixed member 107 supporting the imaging elements, and the fixed member 107 is installed securely to the main body of the portable telephone (not shown). The rod-shaped guide member 108 is passed through the supporting members 104 and 105 of the first and the second lens groups and engaging portions 104*a* and 105*a* are arranged at appropriate locations on the supporting members 104 and 105.

The driving unit 20 consisting of for example, an impact-type piezoelectric actuator is attached to the supporting member 105 for supporting the second lens group 102. The second lens group 102 is driven in the optical axis direction through the supporting member 105 by the driving device including the driving unit 20. The driving unit 20, more specifically, is configured by a supporting member 21, a piezoelectric element 22, a driving member 23 and an engaging member 24. The supporting member 21 is fixed to the main body of the portable telephone (not shown) and holds the piezoelectric element 22 and the driving member 23. The piezoelectric element 22 is arranged with the compressing and extending direction or the polarization direction thereof coincided with the axis direction of the supporting member 21. One end of the driving member 23 is securely attached to the piezoelectric element 22 and the other end is securely attached to the side face of the engaging member 24.

With such configuration, when voltage is applied to the piezoelectric element 22 by a driving means (not shown), the piezoelectric element 22 is extended and compressed in the optical axis direction depending on the direction of the voltage. The extension or compression is transmitted to the engaging member 24 joined by way of the driving member 23. The engaging member 24 is joined to the supporting member 105 of the second lens group, and thus the first lens group 101 and the second lens group 102 are displaceable. By engaging the engaging parts 104a, 105a of the first and the second lens groups 101 and 102 to the cam members and the like (not shown), respectively, the lens groups perform the desired movement necessary for variable power and focusing, etc. By arranging the engaging parts similar to the engaging parts 104a and 105 of the first and the second lens groups to the supporting member 106 of the third lens group, the three lens groups may be simultaneously driven, and variable power and focusing may be performed. Further, with the similar configuration, four or more lens groups may be arranged, and each lens group may be driven independently or in correlation with each other to perform variable power and focusing.

In such imaging apparatus, the rays entering from the subject side pass through the lenses in sequence of the first, the second and the third lens groups 101 to 103. The rays then pass through the parallel plane plate (not shown) arranged next to the third lens group 103. The optical image is then corrected so that a so-called return noise generated when being converted to an electric signal at the imaging element is minimized. The parallel plane plate corresponds to an optical low-pass filter, an infrared cut filter, a cover glass of the imaging element and the like. Finally, the optical image of the object is formed on the light receiving surface of the imaging element (not shown) and then the optical image is converted to the electric signal. The electric signal is subjected to a predetermined digital image processing, image compression processing and the like as necessary, and is recorded in the memory of the portable telephone or personal digital assistant as digital picture signal or is transmitted to other digital equipments by wire or by radio.

A stepping motor and the like may be used when driving each lens group or the optical stop. If the displacement amount is small or if the weight of the lens group is light, a micro-miniature piezoelectric actuator may be independently used for each lens group. Thus, each lens group is independently driven, and further, the entire imaging lens device is made small while suppressing increase in volume of the driving section or electrical power consumption.

The examples of the variable power optical system according to the present invention will now be specifically explained with reference to construction data, aberration diagram and the like.

EXAMPLE 1

The construction data of each lens in Embodiment 1 (Example 1) is shown in Table 1. In the present example, the configuration lenses are all made of glass.

The table shows, from the left of the table, the number of each lens surface, the curvature radius (unit in mm) of each surface, the distance (axial surface distance) (unit in mm) between each lens surfaces on the optical axis in wide-angle end (W), middle point (M), and telephoto end (T), the index of refraction of each lens and the Abbe number. The blank columns of axial surface distance M, T indicate that the value is the same as the value of the W column on the left. The number ri (i=1, 2, 3, . . . ) of each lens surface is the $i^{th}$ number of lens surface counting from the object side, as shown in FIG. 1, and the surface with * on the ri is the aspherical surface. As apparent from the table, in Example 1, both end faces (surface facing the air) of the cemented lenses configuring the first lens group (Gr1) and the second lens group (Gr2), respectively, and both surfaces of the third lens group (Gr3) (fifth lens counting from the object side) are aspherical surfaces. That is, all the lens surfaces facing the air are aspherical surfaces. For each surface of the optical stop (ST), both surfaces of the parallel plane plate (PL), and the light receiving surface of the imaging element (SR) to be a plane surface, the curvature radius thereof is made ∞.

The aspherical surface shape of the lens is defined in the following equation using the local orthogonal coordinate system (x, y, z) with the surface vertex as the origin and the direction from the object towards the imaging element as the positive direction of the z axis.

$$z = \frac{c \cdot h^2}{1 + \sqrt{1 - (1+k)c^2 \cdot h^2}} + A \cdot h^4 + B \cdot h^6 + C \cdot h^8 + D \cdot h^{10}$$

where,

Z: displacement amount in the z axis direction at the position of height h (surface vertex reference)

h: height in the direction perpendicular to the z axis ($h^2 = x^2 + y^2$)

c: paraxial curvature (=1/curvature radius)

A, B, C, D: aspherical surface coefficient of fourth power, sixth power, eighth power, and tenth power K: conical coefficient Table 1 shows the conical coefficient k and the aspherical surface coefficients A, B, C, D. As apparent from the definitional equation, the curvature radius with respect to the aspherical lens shown in Table 1 shows the value near the center of the lens.

The spherical aberration, astigmatism and distortion aberration of the entire optical system (combination of first, second and third lens group) of Example 1 in such lens arrangement and configuration are shown in order from the left side of FIG. 11(a) to (i). FIGS. 11(a) to (c) show each aberration at the wide-angle end (W), FIG. 11(d) to (f) show each aberration at the middle point (M) and FIG. 11(g) to (i) show each aberration at the telephoto end (T). The axis of abscissa of the spherical aberration and astigmatism indicates the shift of the focal position in units of mm, and the axis of abscissa of the distortion aberration indicates the distorted amount in % with respect to the total. The axis of ordinate of the spherical aberration indicates a value standardized at the height of incidence, but the axis of ordinate of astigmatism and distortion aberration indicate the height of image (image height) (units in mm). Further, in the diagram of spherical aberration, the aberrations when using three lights of different wavelengths, red in broken line (wavelength of 656.27 nm), yellow in solid line (so-called d line: wavelength of 587.56 nm), and blue in chain double-dashed line (wavelength of 435.83 nm) are each shown. Further, in the diagram of astigmatism, reference characters S and T represent the results at the sagittal (radial) plane, and tangential (meridional) plane, respectively. The diagrams of astigmatism and distortion aberration are the result when the above yellow line (d line) is used. As apparent from FIG. 11, the lens group of Example 1 shows excellent optical property of chromatic aberration and astigmatism within about 0.1 mm and distortion aberration within about 5% at all of the wide-angle end (W), middle point (M), and telephoto end (T). The focal length (unit in mm) and the F value at the wide-angle end (W), the middle point (M), and the telephoto end (T) in Example 1 are shown in table 8 and table 9, respectively. It is apparent from these tables that the optical system bright at short focus is achieved in the present invention.

EXAMPLE 2

The construction data of each lens in Embodiment 2 (Example 2) is shown in Table 2. As apparent from the table, in Example 2, the surface on the object side of the cemented lens of the first lens group (Gr1), both end faces (surface facing the air) of the cemented lens configuring the second lens group (Gr2), and both surfaces of the third lens group (Gr3) (sixth lens counting from the object side) are aspherical surfaces. In the present example, the configuring lenses are all made of glass.

EXAMPLE 3

The construction data of each lens in Embodiment 3 (Example 3) is shown in Table 3. As apparent from the table, in Example 3, both end faces (surfaces facing the air) of the cemented lens configuring the first lens group (Gr1) and the second lens group (Gr2), respectively, and both surfaces of the third lens group (Gr3) (fifth lens counting from the object side) are aspherical surfaces. That is, all the lens surfaces facing the air are aspherical surfaces. In the present example, the configuring lenses are all made of glass.

EXAMPLE 4

The construction data of each lens in Embodiment 4 (Example 4) is shown in Table 4. As apparent from the table, in Example 4, both end faces (surfaces facing the air) of the cemented lens configuring the first lens group (Gr1) and the second lens group (Gr2), respectively, and both surfaces of the third lens group (Gr3) (fifth lens counting from the object side) and the fourth lens group (Gr4) (sixth lens counting from the object side) are aspherical surfaces. That is, all the lens surfaces facing the air are aspherical surfaces. In the present example, the configuring lenses are all made of glass.

EXAMPLE 5

The construction data of each lens in Embodiment 5 (Example 5) is shown in Table 5. As apparent from the table, in Example 5, both end faces (surfaces facing the air) of the cemented lens configuring the first lens group (Gr1) and the second lens group (Gr2), respectively, and both surfaces of the third lens group (Gr3) (fifth lens counting from the object side) are aspherical surfaces. That is, all the lens surfaces facing the air are aspherical surfaces. In the present example, the first, the second and the fifth lenses, that is, the first lens group (Gr1) and the third lens group (Gr3) are plastic lenses (lens made of resin).

EXAMPLE 6

The construction data of each lens in Embodiment 6 (Example 6) is shown in Table 6. As apparent from the table, in Example 6, both end faces (surface facing the air) of the cemented lens configuring the first lens group (Gr1), both surfaces of the lens (third lens counting from the object side) on the object side of the second lens group (Gr2), and both surfaces of the third lens group (Gr3) (fifth lens counting from the object side) are aspherical surfaces. In the present example, the first, the second and the fifth lenses, that is, the first lens group (Gr1) and the third lens group (Gr3) are plastic lenses.

EXAMPLE 7

The construction data of each lens in Embodiment 7 (Example 7) is shown in Table 7. As apparent from the table, in Example 7, both end faces (surfaces facing the air) of the cemented lens configuring the first lens group (Gr1) and the second lens group (Gr2), respectively, and both surfaces of the third lens group (Gr3) (fifth lens counting from the object side) are aspherical surfaces. That is, all the lens surfaces facing the air are aspherical surfaces. In the present example, the configuring lenses are all made of glass.

The spherical aberration, astigmatism and distortion aberration of the entire optical system (combination of first, second and third lens groups, where in Example 4, the fourth lens group is further included) of Examples 2 to 7 in such lens arrangement and configuration are each shown in FIG. 12 to FIG. 17. The lens groups in any of the examples show excellent optical property of both chromatic aberration and astigmatism within about 0.1 mm and distortion aberration within about 5% at all of the wide-angle end (W), middle point (M), and telephoto end (T). The focal length (unit in mm) and the F value at the wide-angle end (W), the middle point (M), and the telephoto end (T) in Examples 2 to 7 are shown in Table 8 and Table 9, respectively. As apparent from theses tables, the optical system bright at near focus is achieved in the present invention, similar to Example 1.

Further, the values of equations (1) to (16) obtained in Examples 1 to 7 are shown in Table 10. The desired values described above are obtained in the present example in all of the conditions.

As explained above, the present example is configured mainly by glass lenses, and in examples 5 and 6, the plastic lenses (lens made of resin) are also used. However, the present invention is not limited thereto, and one or two or more of each lens group may be a plastic lens. Particularly, the first lens group (Gr1) has a greater lens diameter than the other lens group, and thus the lightness effect when made of plastic is the greatest. In the variable power optical system according to the present invention, the displacement amount of the second lens group (Gr2) is the largest, but the load of the lens driving device may be reduced by manufacturing it with plastic. Further, as the optical power of the third lens group (Gr3) is weak compared to the other lenses, it may be made of plastic while maintaining a satisfactory aberration correction. In all cases, by forming the lenses with plastic, the lens driving device becomes small, and as a result, the entire imaging apparatus including the lens group and the lens driving device further becomes small. As explained above, the imaging apparatus including the variable power optical system according to the present invention may be mounted to digital equipment such as portable telephone as it is small and light. Thus, still image and moving image may be taken at the desired magnification. Further, as a high optical performance capable of responding to high-pixel imaging elements of equal to or greater than two million pixel class are provided, high advantage is ensured even for electronic zooming method requiring interpolation.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

TABLE 1

| Lens surface | Curvature radius | Axial surface distance (mm) W | M | T | Index of refraction | Abbe number |
|---|---|---|---|---|---|---|
| r1* | −53.091 | | | | | |
| | | 0.500 | | | 1.48740 | 70.44 |
| r2 | 4.282 | | | | | |
| | | 0.776 | | | 2.00330 | 28.30 |
| r3* | 4.967 | | | | | |
| | | 3.472 | 1.629 | 0.500 | | |
| r4 | ∞ | | | | | |
| | | 0.100 | | | | |
| r5* | 3.011 | | | | | |
| | | 1.341 | | | 1.84003 | 40.90 |
| r6 | −2.614 | | | | | |
| | | 0.957 | | | 1.69718 | 26.74 |
| r7* | 3.261 | | | | | |
| | | 1.216 | 4.065 | 5.964 | | |
| r8* | −19.420 | | | | | |
| | | 0.862 | | | 2.00330 | 28.30 |
| r9* | −6.076 | | | | | |
| | | 2.275 | 1.270 | 0.500 | | |
| r10 | ∞ | | | | | |
| | | 0.500 | | | 1.51680 | 64.20 |
| r11 | ∞ | | | | | |
| | | 0.500 | | | | |
| r12 | ∞ | | | | | |

| Lens surface | Conical coefficient | Aspherical surface coefficient A | B | C | D |
|---|---|---|---|---|---|
| r1* | 0 | −2.85E−03 | 2.67E−04 | −6.27E−06 | −2.23E−07 |
| r3* | 0 | −2.69E−03 | 3.03E−04 | −1.34E−08 | −1.94E−06 |
| r5* | 0 | −2.84E−03 | −8.34E−04 | 2.27E−04 | −8.24E−05 |
| r7* | 0 | 1.47E−02 | 2.08E−04 | 8.80E−04 | −1.40E−04 |
| r8* | 0 | 3.14E−03 | −5.37E−04 | 1.46E−05 | 1.28E−06 |
| r9* | 0 | 4.11E−03 | −1.76E−04 | −4.59E−05 | 3.77E−06 |

TABLE 2

| Lens surface | Curvature radius | Axial surface distance (mm) W | M | T | Index of refraction | Abbe number |
|---|---|---|---|---|---|---|
| r1* | −20.497 | | | | | |
| | | 0.500 | | | 1.48749 | 70.44 |
| r2 | 7.534 | | | | | |
| | | 1.161 | | | 1.84826 | 29.57 |
| r3 | 16.284 | | | | | |
| | | 0.827 | | | | |
| r4 | −17.410 | | | | | |
| | | 0.500 | | | 1.51963 | 66.21 |
| r5 | 35.502 | | | | | |
| | | 6.977 | 2.115 | 0.500 | | |
| r6 | ∞ | | | | | |
| | | 0.100 | | | | |
| r7* | 3.823 | | | | | |
| | | 1.259 | | | 1.84525 | 40.44 |
| r8 | −4.578 | | | | | |
| | | 2.233 | | | 1.73420 | 25.58 |
| r9* | 4.070 | | | | | |
| | | 1.987 | 6.759 | 9.702 | | |
| r10* | −40.781 | | | | | |
| | | 1.121 | | | 1.84936 | 35.44 |
| r11* | −5.920 | | | | | |
| | | 2.335 | 1.396 | 0.748 | | |
| r12 | ∞ | | | | | |
| | | 0.500 | | | 1.51680 | 64.20 |
| r13 | ∞ | | | | | |
| | | 0.500 | | | | |
| r14 | ∞ | | | | | |

| Lens surface | Conical coefficient | Aspherical surface coefficient A | B | C | D |
|---|---|---|---|---|---|
| r1* | 0 | 3.45E−04 | −2.06E−06 | 3.97E−08 | −6.50E−10 |
| r7* | 0 | −1.05E−03 | −1.11E−04 | 1.63E−05 | −4.92E−06 |
| r9* | 0 | 7.73E−03 | 3.71E−04 | 1.87E−04 | −1.02E−05 |
| R10* | 0 | −1.41E−03 | 3.80E−04 | −3.05E−05 | 1.30E−06 |
| R11* | 0 | 4.78E−04 | 3.16E−04 | −3.03E−05 | 1.42E−06 |

TABLE 3

| Lens surface | Curvature radius | Axial surface distance (mm) W | M | T | Index of refraction | Abbe number |
|---|---|---|---|---|---|---|
| r1* | −12.956 | | | | | |
| | | 0.500 | | | 1.48749 | 70.44 |
| r2 | 5.817 | | | | | |
| | | 0.858 | | | 1.84666 | 23.82 |
| r3* | 7.771 | | | | | |
| | | 5.738 | 1.773 | 0.500 | | |
| r4 | ∞ | | | | | |
| | | 0.100 | | | | |
| r5* | 3.441 | | | | | |
| | | 1.159 | | | 1.85000 | 40.04 |
| r6 | −5.247 | | | | | |
| | | 2.304 | | | 1.76706 | 23.63 |
| r7* | 4.365 | | | | | |
| | | 0.893 | 5.377 | 8.084 | | |
| r8* | −14.074 | | | | | |
| | | 0.996 | | | 1.84932 | 35.15 |
| r9* | −4.955 | | | | | |
| | | 2.453 | 1.341 | 0.500 | | |
| r10 | ∞ | | | | | |
| | | 0.500 | | | 1.51680 | 64.20 |
| r11 | ∞ | | | | | |
| | | 0.500 | | | | |
| r12 | ∞ | | | | | |

| Lens surface | Conical coefficient | Aspherical surface coefficient A | B | C | D |
|---|---|---|---|---|---|
| r1* | 0 | −5.85E−04 | 1.35E−04 | −6.30E−06 | 9.73E−08 |
| r3* | 0 | −1.05E−03 | 1.62E−04 | −5.69E−06 | −1.04E−07 |
| r5* | 0 | −1.18E−03 | −3.62E−04 | 2.52E−04 | −7.26E−05 |
| r7* | 0 | 1.12E−02 | 3.73E−04 | 5.44E−04 | −3.79E−05 |
| r8* | 0 | −1.03E−03 | 5.54E−04 | −3.91E−05 | 1.69E−06 |
| r9* | 0 | 1.54E−03 | 3.21E−04 | −2.10E−05 | 1.32E−06 |

TABLE 4

| Lens surface | Curvature radius | Axial surface distance (mm) W | M | T | Index of refraction | Abbe number |
|---|---|---|---|---|---|---|
| r1* | −32.721 | | | | | |
| | | 0.500 | | | 1.49753 | 69.00 |
| r2 | 5.552 | | | | | |
| | | 1.002 | | | 1.82724 | 23.33 |
| r3* | 7.107 | | | | | |
| | | 6.770 | 2.219 | 0.500 | | |
| r4 | ∞ | | | | | |
| | | 0.100 | | | | |

TABLE 4-continued

| Lens surface | Curvature radius | Axial surface distance (mm) | | | Index of refraction | Abbe number |
|---|---|---|---|---|---|---|
| r5* | 2.941 | | | | | |
| | | 1.331 | | | 1.82277 | 42.53 |
| r6 | −3.877 | | | | | |
| | | 0.500 | | | 1.67882 | 27.82 |
| r7* | 2.900 | | | | | |
| | | 1.078 | 5.795 | 8.391 | | |
| r8* | −324.344 | | | | | |
| | | 2.177 | | | 1.80932 | 43.94 |
| r9* | −4.330 | | | | | |
| | | 1.542 | 0.883 | 0.500 | | |
| r10* | −4.048 | | | | | |
| | | 0.500 | | | 1.76509 | 29.04 |
| r11* | −6.894 | | | | | |
| | | 0.500 | | | | |
| r12 | ∞ | | | | | |
| | | 0.500 | | | 1.5168 | 64.20 |
| r13 | ∞ | | | | | |
| | | 0.500 | | | | |
| r14 | ∞ | | | | | |

| Lens surface | Conical coefficient | Aspherical surface coefficient | | | |
|---|---|---|---|---|---|
| | | A | B | C | D |
| r1* | 0 | 3.77E−04 | 3.24E−05 | −1.57E−06 | 2.00E−08 |
| r3* | 0 | −2.65E−04 | 1.35E−04 | −6.60E−06 | 7.62E−08 |
| r5* | 0 | −9.52E−04 | −4.37E−04 | 2.17E−04 | −8.55E−05 |
| r7* | 0 | 1.14E−02 | 1.24E−03 | 4.66E−04 | −3.57E−05 |
| r8* | 0 | −2.21E−03 | −1.55E−04 | −1.32E−05 | 5.35E−07 |
| r9* | 0 | 3.29E−03 | −1.07E−04 | −1.11E−05 | 5.89E−07 |
| R10* | 0 | 1.45E−02 | 5.56E−05 | −2.35E−05 | 3.38E−07 |
| R11* | 0 | 7.00E−03 | 4.37E−04 | 5.70E−06 | −3.26E−06 |

TABLE 5

| Lens surface | Curvature radius | Axial surface distance (mm) | | | Index of refraction | Abbe number |
|---|---|---|---|---|---|---|
| | | W | M | T | | |
| r1* | −9.056 | | | | | |
| | | 0.800 | | | 1.53048 | 55.72 |
| r2 | 6.929 | | | | | |
| | | 1.910 | | | 1.58340 | 30.23 |
| r3* | 28.038 | | | | | |
| | | 8.314 | 3.200 | 1.400 | | |
| r4 | ∞ | | | | | |
| | | 0.100 | | | | |
| r5* | 3.171 | | | | | |
| | | 1.342 | | | 1.85335 | 39.62 |
| r6 | −6.828 | | | | | |
| | | 1.183 | | | 1.72284 | 25.43 |
| r7* | 2.898 | | | | | |
| | | 1.400 | 6.705 | 9.840 | | |
| r8* | 45.880 | | | | | |
| | | 1.926 | | | 1.53048 | 55.72 |
| r9* | −4.449 | | | | | |
| | | 2.525 | 1.596 | 1.000 | | |
| r10 | ∞ | | | | | |
| | | 0.500 | | | 1.51680 | 64.20 |
| r11 | ∞ | | | | | |
| | | 0.500 | | | | |
| r12 | ∞ | | | | | |

| Lens surface | Conical coefficient | Aspherical surface coefficient | | | |
|---|---|---|---|---|---|
| | | A | B | C | D |
| r1* | 0 | 1.23E−03 | −4.90E−05 | 2.20E−06 | −4.13E−08 |
| r3* | 0 | 2.00E−04 | −4.12E−05 | 4.99E−06 | −1.92E−07 |
| r5* | 0 | −8.17E−04 | −3.70E−04 | 2.12E−04 | −6.70E−05 |
| r7* | 0 | 1.04E−02 | 9.21E−04 | 5.27E−04 | −1.10E−04 |
| r8* | 0 | 1.06E−03 | −1.34E−04 | 1.23E−05 | −9.04E−08 |
| r9* | 0 | 6.05E−03 | −3.84E−04 | 2.29E−05 | −2.40E−08 |

TABLE 6

| Lens surface | Curvature radius | Axial surface distance (mm) | | | Index of refraction | Abbe number |
|---|---|---|---|---|---|---|
| | | W | M | T | | |
| r1* | −14.217 | | | | | |
| | | 0.800 | | | 1.53048 | 55.72 |
| r2 | 6.549 | | | | | |
| | | 1.689 | | | 1.58340 | 30.23 |
| r3* | 13.978 | | | | | |
| | | 8.124 | 3.183 | 1.400 | | |
| r4 | ∞ | | | | | |
| | | 0.100 | | | | |
| r5* | 2.890 | | | | | |
| | | 1.326 | | | 1.75450 | 51.57 |
| r6* | −12.992 | | | | | |
| | | 0.100 | | | | |
| r7 | 36.825 | | | | | |
| | | 1.149 | | | 1.77627 | 27.88 |
| r8 | 2.356 | | | | | |
| | | 1.400 | 6.448 | 9.509 | | |
| r9* | 63.470 | | | | | |
| | | 1.926 | | | 1.53048 | 55.72 |
| r10* | −4.456 | | | | | |
| | | 2.385 | 1.486 | 1.000 | | |
| r11 | ∞ | | | | | |
| | | 0.500 | | | 1.51680 | 64.20 |
| r12 | ∞ | | | | | |
| | | 0.500 | | | | |
| r13 | ∞ | | | | | |

| Lens surface | Conical coefficient | Aspherical surface coefficient | | | |
|---|---|---|---|---|---|
| | | A | B | C | D |
| r1* | 0 | −8.47E−05 | 2.45E−05 | −1.34E−06 | 3.61E−08 |
| r3* | 0 | −9.84E−04 | 1.38E−04 | −1.41E−05 | 5.95E−07 |
| r5* | 0 | −1.53E−03 | 1.03E−03 | −3.95E−04 | 1.77E−04 |
| r6* | 0 | 7.05E−03 | 1.72E−03 | −7.54E−04 | 4.29E−04 |
| r9* | 0 | −4.11E−04 | −4.93E−05 | 2.44E−05 | −1.22E−06 |
| R10* | 0 | 3.76E−03 | −3.24E−04 | 4.73E−05 | −1.74E−06 |

TABLE 7

| Lens surface | Curvature radius | Axial surface distance (mm) | | | Index of refraction | Abbe number |
|---|---|---|---|---|---|---|
| | | W | M | T | | |
| r1* | −12.161 | | | | | |
| | | 1.000 | | | 1.51789 | 66.41 |
| r2 | 4.411 | | | | | |
| | | 1.363 | | | 1.84758 | 26.84 |
| r3* | 6.016 | | | | | |
| | | 3.087 | 1.128 | 0.500 | | |
| r4 | ∞ | | | | | |
| | | 0.100 | | | | |
| r5* | 3.174 | | | | | |
| | | 1.000 | | | 1.84677 | 40.31 |
| r6 | −4.263 | | | | | |
| | | 1.500 | | | 1.72179 | 25.48 |
| r7* | 3.797 | | | | | |
| | | 2.151 | 8.448 | 11.956 | | |
| r8* | −459.484 | | | | | |
| | | 1.061 | | | 1.85000 | 40.04 |
| r9* | −6.406 | | | | | |
| | | 2.653 | 1.472 | 0.519 | | |
| r10 | ∞ | | | | | |
| | | 0.500 | | | 1.51680 | 64.20 |
| r11 | ∞ | | | | | |
| | | 0.500 | | | | |
| r12 | ∞ | | | | | |

TABLE 7-continued

| Lens surface | Conical coefficient | Aspherical surface coefficient | | | |
|---|---|---|---|---|---|
| | | A | B | C | D |
| r1* | 0 | 4.62E−05 | 7.80E−05 | −5.72E−06 | 1.91E−07 |
| r3* | 0 | −1.10E−03 | 2.68E−04 | −4.46E−05 | 4.03E−06 |
| r5* | 0 | −2.20E−03 | −2.44E−05 | −4.77E−05 | 2.84E−06 |
| r7* | 0 | 1.00E−02 | 1.11E−03 | 5.18E−05 | 7.65E−05 |
| r8* | 0 | −5.70E−04 | −1.33E−04 | 3.94E−05 | −2.08E−06 |
| r9* | 0 | 1.38E−03 | −2.60E−04 | 4.97E−05 | −2.38E−06 |

TABLE 8

Focal length (mm)

| | W | M | T |
|---|---|---|---|
| Example 1 | 4.7 | 7.1 | 9.4 |
| Example 2 | 4.9 | 9.7 | 13.8 |
| Example 3 | 4.5 | 9.0 | 12.7 |
| Example 4 | 4.2 | 8.3 | 11.9 |
| Example 5 | 4.3 | 8.5 | 12.2 |
| Example 6 | 4.7 | 9.3 | 13.2 |
| Example 7 | 5.2 | 10.4 | 14.7 |

TABLE 9

F value

| | W | M | T |
|---|---|---|---|
| Example 1 | 2.8 | 3.7 | 4.5 |
| Example 2 | 2.8 | 4.3 | 5.5 |
| Example 3 | 2.8 | 4.3 | 5.6 |
| Example 4 | 2.8 | 4.4 | 5.6 |
| Example 5 | 3.0 | 4.7 | 6.0 |
| Example 6 | 3.0 | 4.7 | 6.0 |
| Example 7 | 2.8 | 4.7 | 6.3 |

TABLE 10

| | Example 1 | Example 2 | Example 3 | Example 4 | Example 5 | Example 6 | Example 7 |
|---|---|---|---|---|---|---|---|
| (1) | 0.61 | 0.86 | 0.68 | 1.28 | 0.97 | 0.91 | 0.74 |
| (2) | 1.11 | 1.42 | 1.30 | 1.66 | 1.77 | 1.55 | 1.09 |
| (3) | 42.1 | 40.9 | 46.6 | 45.7 | 25.5 | 25.5 | 39.6 |
| (4) | 2.57 | 2.83 | 2.65 | 3.44 | 3.18 | 2.95 | 1.80 |
| (5) | 0.41 | 0.72 | 0.36 | 0.40 | 0.48 | 0.43 | 0.44 |
| (6) | 0.55 | 0.50 | 0.46 | 0.58 | 0.62 | 0.55 | 0.38 |
| (7) | 0.26 | 0.16 | 0.20 | 0.19 | 0.15 | 0.15 | 0.16 |
| (8) | 0.38 | 0.24 | 0.28 | 0.25 | 0.21 | 0.23 | 0.35 |
| (9) | 0.75 | 0.70 | 0.80 | 0.70 | 0.59 | 0.66 | 0.74 |
| (10) | 14.2 | 14.9 | 16.4 | 14.7 | 14.2 | 23.7 | 14.8 |
| (11) | 1.04 | 1.00 | 1.08 | 1.06 | 0.99 | 1.01 | 1.13 |
| (12) | 1.29 | 1.00 | 0.93 | 1.21 | 1.12 | 1.04 | 0.63 |
| (13) | 23.5 | 16.3 | 22.7 | 24.9 | 16.8 | 17.0 | 15.6 |
| (14) | 17.8 | 19.0 | 22.0 | 22.8 | 20.1 | 19.9 | 21.8 |
| (15) | 0.52 | 0.36 | 0.36 | 0.33 | 0.32 | 0.25 | 0.33 |
| (16) | 2.003 | 1.849 | 1.850 | 1.827 | 1.853 | 1.776 | 1.850 |

What is claimed is:

1. A variable power optical system that performs variable power by changing the distance between each lens group in an optical axis direction, comprising from a most object side:
   a first lens group including a cemented lens, configured by less than or equal to three lenses, including an aspherical surface and having a negative optical power as a whole; and
   a second lens group including an aspherical surface and having a positive optical power as a whole,
   wherein the distance between said first lens group and said second lens group is narrowed when performing variable power from wide-angle end to telephoto end, and
   wherein the cemented lens of said first lens group is at the most object side and includes from the object side a negative lens and a positive lens.

2. A variable power optical system according to claim 1, further comprising a stop arranged between said first lens group and said second lens group, wherein said stop is displaced towards the object side alone when carrying out variable power from the wide-angle end to the telephoto end.

3. A variable power optical system according to claim 1, wherein all the lens surfaces facing the air are an aspherical surface.

4. A variable power optical system that performs variable power by changing the distance between each lens group in an optical axis direction, comprising from a most object side:
   a first lens group including a cemented lens, configured by less than or equal to three lenses, including an aspherical surface and having a negative optical power as a whole; and
   a second lens group including an aspherical surface and having a positive optical power as a whole,
   wherein the distance between said first lens group and said second lens group is narrowed when performing variable power from wide-angle end to telephoto end, and
   wherein the following condition is satisfied, $0.7 < f_2 < f_w < 2$ where,
   $f_2$: total focal length of said second lens group,
   fw: total focal length of the entire optical system at the wide-angle end.

5. A variable power optical system according to claim 4, further comprising a stop arranged between said first lens group and said second lens group, wherein said stop is displaced towards the object side alone when carrying out variable power from the wide-angle end to the telephoto end.

6. A variable power optical system according to claim 4, wherein all the lens surfaces facing the air are an aspherical surface.

7. A variable power optical system that performs variable power by changing the distance between each lens group in an optical axis direction, comprising from a most object side:
   a first lens group including a cemented lens, configured by less than or equal to three lenses, including an aspherical surface and having a negative optical power as a whole; and
   a second lens group including an aspherical surface and having a positive optical power as a whole,
   wherein the distance between said first lens group and said second lens group is narrowed when performing variable power from wide-angle end to telephoto end, and
   wherein the cemented lens of said first lens group consists from the object side of a negative lens and a positive lens and satisfies the following condition, $|v_{1n} - v_{1p}| > 15$ where,
   $v_{1n}$: Abbe number of the negative lens in said first lens group, $v_{1p}$: Abbe number of the positive lens in said first lens group.

8. A variable power optical system according to claim 7, further comprising a stop arranged between said first lens group and said second lens group, wherein said stop is displaced towards the object side alone when carrying out variable power from the wide-angle end to the telephoto end.

9. A variable power optical system according to claim 7, wherein all the lens surfaces facing the air are an aspherical surface.

10. A variable power optical system that performs variable power by changing the distance between each lens group in an optical axis direction, comprising from a most object side:
   a first lens group including a cemented lens, conjured by less than or equal to three lenses, including an aspherical surface and having a negative optical power as a whole; and
   a second lens group including an aspherical surface and having a positive optical power as a whole,
   wherein the distance between said first lens group and said second lens group is narrowed when performing variable power from wide-angle end to telephoto end, and
   wherein said first lens group is configured only by the cemented lens.

11. A variable power optical system according to claim 10, further comprising a stop arranged between said first lens group and said second lens group, wherein said stop is displaced towards the object side alone when carrying out variable power from the wide-angle end to the telephoto end.

12. A variable power optical system according to claim 10, wherein all the lens surfaces facing the air are an aspherical surface.

13. A variable power optical system that performs variable power by changing the distance between each lens group in an optical axis direction, comprising from a most object side:
   a first lens group including only a cemented lens, configured by less than or equal to three lenses, including an aspherical surface and having a negative optical power as a whole; and
   a second lens group including an aspherical surface and having a positive optical power as a whole;
   a third lens group having a positive optical power as a whole,
   wherein the distance between said first lens group and said second lens group is narrowed when performing variable power from wide-angle end to telephoto end, and
   wherein each lens group is configured only by a single lens or a cemented lens.

14. A variable power optical system according to claim 13, further comprising a stop arranged between said first lens group and said second lens group, wherein said stop is displaced towards the object side alone when carrying out variable power from the wide-angle end to the telephoto end.

15. A variable power optical system according to claim 13, wherein all the lens surfaces facing the air are an aspherical surface.

* * * * *

UNITED STATES PATENT AND TRADEMARK OFFICE
CERTIFICATE OF CORRECTION

PATENT NO. : 7,265,912 B2 Page 1 of 1
APPLICATION NO. : 11/105844
DATED : September 4, 2007
INVENTOR(S) : Keiji Matsusaka It is certified that error appears in the above-identified patent and that said Letters Patent is hereby corrected as shown below:

Column 29:
line 15, delete "conjured by" and insert -- configured by --.

Signed and Sealed this

Twentieth Day of November, 2007

JON W. DUDAS
*Director of the United States Patent and Trademark Office*